United States Patent
Green

(10) Patent No.: US 11,823,882 B2
(45) Date of Patent: Nov. 21, 2023

(54) MASS CORRECTION

(71) Applicant: Micromass UK Limited, Wilmslow (GB)

(72) Inventor: Martin Raymond Green, Bowdon (GB)

(73) Assignee: Micromass UK Limited, Wilmslow (GB)

( * ) Notice: Subject to any disclaimer, the term of this patent is extended or adjusted under 35 U.S.C. 154(b) by 214 days.

(21) Appl. No.: 17/269,869

(22) PCT Filed: Aug. 30, 2019

(86) PCT No.: PCT/GB2019/052416
§ 371 (c)(1),
(2) Date: Feb. 19, 2021

(87) PCT Pub. No.: WO2020/044050
PCT Pub. Date: Mar. 5, 2020

(65) Prior Publication Data
US 2022/0351954 A1 Nov. 3, 2022

(30) Foreign Application Priority Data
Aug. 30, 2018 (GB) ...................... 1814125

(51) Int. Cl.
*H01J 49/00* (2006.01)
*G01N 30/72* (2006.01)
*G01N 30/86* (2006.01)

(52) U.S. Cl.
CPC ...... *H01J 49/0036* (2013.01); *G01N 30/7233* (2013.01); *G01N 30/8665* (2013.01); *H01J 49/0031* (2013.01)

(58) Field of Classification Search
CPC .............. H01J 49/0036; H01J 49/0031; H01J 49/0009; G01N 30/7233; G01N 30/8665; G01N 30/72; G01N 30/8641
(Continued)

(56) References Cited

U.S. PATENT DOCUMENTS

2003/0110000 A1*  6/2003  Quimby ............. G01N 30/8665
                                                          702/89
2004/0111232 A1   6/2004  Butler et al.
2016/0203963 A1   7/2016  Green

FOREIGN PATENT DOCUMENTS

CN    101614698 A    12/2009
CN    107167430 A    9/2017
(Continued)

OTHER PUBLICATIONS

International Search Report and Written Opinion for International Application No. PCT/GB2019/052416, dated Nov. 29, 2019.
(Continued)

*Primary Examiner* — Michael Maskell
(74) *Attorney, Agent, or Firm* — Goodwin Procter LLP

(57) ABSTRACT

A method of mass spectrometry comprising the steps of: providing a library of background ion data including m/z data for multiple background ions in respect of different chromatographic conditions including a change of solvent composition from aqueous (1) to organic (3), chromatographically separating a sample containing analyte components, wherein the chromatographic separation is performed under a chromatographic condition in respect of which background ion data is provided in the library, analysing the sample to obtain sample data comprising m/z values for the sample components as a function of retention time (RT), and calculating one or more error values including ppm error as a function of retention time based on a comparison between background ions identified in the sample data and the library
(Continued)

of background ion data. Outliers (4), corrupted measurements and inconsistent measurements at specific retention times are rejected.

20 Claims, 8 Drawing Sheets

(58) Field of Classification Search
USPC .................................................. 250/281, 282
See application file for complete search history.

(56) References Cited

FOREIGN PATENT DOCUMENTS

| EP | 0437829 | A1 | | 7/1991 | |
|----|---------|----|---|--------|---|
| EP | 3361246 | A1 | | 8/2018 | |
| GB | 2536536 | A | * | 9/2016 | ............. G01N 30/86 |
| GB | 2536536 | A | | 9/2016 | |
| JP | H04-212059 | A | | 8/1992 | |
| JP | H07103961 | A | | 4/1995 | |
| JP | 2002-527756 | A | | 8/2002 | |
| JP | 2006-038628 | A | | 2/2006 | |
| JP | 2009031201 | A | | 2/2009 | |
| JP | 4337678 | B2 | * | 9/2009 | |
| JP | 4337678 | B2 | | 9/2009 | |
| WO | 2000022649 | A1 | | 4/2000 | |
| WO | 2013149963 | A1 | | 10/2013 | |
| WO | 2018003011 | A1 | | 1/2018 | |

OTHER PUBLICATIONS

Combined Search and Examination Report for GB Application No. GB1814125.9, dated Feb. 28, 2019.
Combined Search and Examination Report for GB Application No. GB1912459.3, dated Feb. 12, 2020.
Dromey, R. G. et al., "Extraction of Mass Spectra Free of Background and Neighboring Component Contributions From Gas Chronomatography/Mass Spectrometrydata", Analytical Chemistry, American Chemical Society, 48(9):1368-1375, Aug. 1, 1976.
Kind, T. et al., "Advances in Structure Elucidation of Small Molecules Using Mass Spectrometry", Bioanalytical Reviews, 2(1-4):23-60, Aug. 21, 2010.
Office Action for Chinese Patent Application No. 201980056069.7, dated Aug. 12, 2023.
Liu Zhongmin, "General Rules for Analytical Methods of Modern Analytical Instruments and Metrological Verification Regulations", Science and Technology Literature Publishing House Japan, No. 130, p. 70-72, (1997).

* cited by examiner

MASS CORRECTION

CROSS-REFERENCE TO RELATED APPLICATIONS

This application is a U.S. national phase filing claiming the benefit of and priority to International Patent Application No. PCT/GB2019/052416, filed Aug. 30, 2019, which claims priority from and the benefit of United Kingdom patent application No. 1814125.9 filed on Aug. 30, 2018. The entire contents of these applications are incorporated herein by reference.

FIELD

The present disclosure relates generally to mass spectrometry and in particular to mass spectrometers and methods of mass spectrometry.

BACKGROUND

Chromatographic techniques such as liquid chromatography ("LC") and gas chromatography ("GC") coupled with mass spectrometry are routinely used to analyse samples.

Various techniques have been proposed to attempt to correct mass to charge ratio data obtained after performing chromatographic separation on a sample.

One technique is described in GB 2536536 (Micromass). This technique involves performing mass to charge ratio correction by reference to matrix components which are present in a sample. The matrix components may include components of biological matrices such as plasma, urine, faeces and bile, or, in other applications, components of matrices such as soil and various types of food e.g. orange, ginger and apple etc.

U.S. Pat. No. 9,418,824 describes a method of calibrating a mass spectrometer using a lock mass.

It is known to correct for mass to charge ratio drift in chromatography techniques. For example, background ions such as solvent ions (or column bleed ions in the case of gas chromatography), have been used to correct for mass to charge ratio drift. These methods rely upon being able to determine precisely the identity of the background ions, to enable an exact m/z ratio value for the background ions to be calculated based on the known elemental composition of the background ions.

GB2383963 (Agilent) discloses correcting the time axis of local chromatographic data in comparison to stored reference data.

US2014/0260509 (Pohl) discloses a method of calibrating a chromatography system.

It is desired to provide an improved method of mass analysing a sample using chromatographic techniques.

SUMMARY

According to an aspect of the present disclosure there is provided a method comprising:
providing a library of measured background component data, the measured background component data comprising, for each one of a set of a plurality of different chromatographic conditions, one or more physico-chemical properties of one or more background components expected to be detected when performing chromatographic separation under the condition;
chromatographically separating a sample, the sample containing one or more analyte components, wherein at least some of the chromatographic separation is performed under a chromatographic condition in respect of which background component data is provided in the library;
analysing the sample to obtain output data including sample data comprising one or more physico-chemical properties of one or more sample components as a function of retention time;
and calculating one or more error values as a function of retention time based on a comparison between one or more background components identified in the output data and background component data obtained from the library of background component data.

The methods disclosed herein are applicable to any chromatographic separation technique and/or apparatus in which a mobile phase moves through a stationary phase. Thus, the chromatographic separation used in sample analysis, is a chromatographic separation in which a mobile phase moves through a stationary phase. The chromatography apparatus used in sample separation is an apparatus for performing such a chromatographic separation. It will be appreciated that, as discussed below, the apparatus used in obtaining the library data need not be the same as the apparatus used in subsequent chromatographic separation of a sample, but will be of the same general type, to the extent that the mobile phase may be the same, or sufficiently similar, to provide corresponding chromatographic conditions to those to which the library relates. Typically the stationary phase is held in a column. The mobile phase includes an eluent, which acts as a carrier for a sample to be analysed, moving the sample (and hence one or more analyte components) through the system. As the mobile phase moves through the stationary phase during a chromatographic separation, analyte components from the sample elute from the separation system at different times, depending upon the relative affinity of the particular analyte component for the mobile or stationary phases. Analyte components with a stronger affinity for the stationary phase will spend more time immobilized in that phase, and take longer to pass through the system, while analyte components with a stronger affinity from the mobile phase will move more rapidly through the system. In this way, the analyte components may be separated and will be detected at different times. The time between the sample being introduced to the chromatography apparatus e.g. column and being detected is known as the retention time. The methods described herein may be methods of mass spectrometry.

The eluent is a fluid, and may be a liquid or a gas.

The chromatographic separation of the sample may be a gas or liquid chromatographic separation e.g. liquid column chromatographic separation. In gas chromatography, the eluent is a carrier gas, such as an inert gas e.g. helium, hydrogen or nitrogen. The stationary phase may include a solid e.g. an adsorbent or a liquid supported on a solid. In liquid chromatography the eluent is a liquid solvent.

When performing chromatographic separation, background components may arise for various reasons. Background components are components which are detected after passing through the chromatography apparatus which do not correspond to components introduced into the apparatus as part of a sample i.e. analyte or matrix ions. For example, background components may be or include components of an eluent e.g. one or more solvent components or a carrier, and/or any additives included in the eluent. Additives may be used for various purposes, e.g. to enhance ionisation efficiency. The background components may be solvent ion clusters or other solvent, or, more generally eluent, species.

Alternatively or additionally background components may include components which are not known components of the eluent e.g. solvent. For example, detected background components may arise from contamination of the eluent e.g. solvent or any other additives in the eluent. The eluent e.g. solvent may not be completely pure. The background components may alternatively or additionally have leached out of glass or plastic components of the apparatus e.g. of the chromatographic column, a solvent delivery system, or any other tubing or fittings etc. Thus, the background components may arise from any or all of; the known components of the eluent e.g. solvent or carrier gas and/or any additives, contamination of the eluent e.g. solvent or carrier gas, and/or from materials of components of the chromatography apparatus. Often the source of particular detected background components is not easy to determine, and may vary depending upon the exact method and hardware used. In general, the term "background components" may refer to any components which do not form part of the sample, i.e. an analyte, and where applicable, a matrix with which the analyte is introduced.

In general background components e.g. arising from contaminants are undesirable, but difficult to avoid, and, as the sensitivity of mass spectrometer ion sources increases, become increasingly statistically significant in mass spectra. Nonetheless, the Applicant has realised that the presence of background components may be useful, and can be exploited, in the context of identifying how obtained sample data should be corrected.

As mentioned above, some prior art techniques involve using background components as internal calibrants during a chromatographic separation, in order to correct for m/z drift during and between analysis. However, such techniques require knowledge of the precise composition of the background components present. The Applicant has recognised that in practice, it is not easy to know what background components are present for any given separation. The background components produced may vary depending upon the precise method and apparatus used. For example, a change in the composition of the eluent used e.g. a different solvent mixture and/or additives, may give rise to different background components.

One factor which influences the background components produced is the chromatographic i.e. elution conditions used. When performing chromatographic separation, it is common to perform the separation under more than one chromatographic condition, in order to change the way in which different analyte components elute. A given sample may include analyte components having significantly different retention properties under any given set of chromatographic conditions. For example, for a particular set of conditions, certain components may take too long to elute, or may not elute at all. If conditions are changed to reduce the retention time for these components, other components may elute so quickly that it is difficult to resolve their peaks. By performing separation under multiple different chromatographic conditions, including conditions which enable both the faster and slower eluting components to be adequately detected, this problem may be overcome. In some techniques a chromatographic condition is varied during a separation, whether continually or in a stepwise manner, between an initial and final condition. Each one of the initial and final conditions may be selected to favour the elution of a one of the faster and slower eluting components. This may be referred to as "programming". In gas chromatography, the column temperature may be varied in this way. In liquid chromatography, the composition of the eluent may be changed as a function of time. This may be referred to as "gradient elution" or "gradient programming". As the background components produced are dependent upon the chromatographic conditions, this provides further difficulty in trying to identify the background components present at any time.

The Applicant has realised that the background components expected to be present may be determined by measurement in relation to a set of a plurality of different chromatographic conditions. One or more physico-chemical properties of the background components measured under the applicable condition may be calculated and added to a reference library. When a subsequent chromatographic separation experiment is performed on a sample, at least in part under a chromatographic condition in respect of which background data is stored in the library, one or more of the background components may then be identified in the output data, and an error value as a function of retention time calculated based on a comparison of the one or more identified background components and the applicable library data. The methods disclosed herein rely upon the identification of background components in the output data by reference to one or more physico-chemical properties of the components e.g. a mass to charge ratio value, e.g. ratio, and therefore do not rely upon knowing the elemental composition of specific background components.

The step of providing the library of background component data for each one of the set of a plurality of chromatographic conditions may comprise passing a mobile phase through a chromatography apparatus and performing measurements on the mobile phase under each one of the set of a plurality of different chromatographic conditions to determine background component data for each chromatographic condition, wherein the measurements of the mobile phase to determine the background component data are performed while the mobile phase is being passed through the chromatography apparatus, and without the introduction of a sample comprising an analyte to the mobile phase. The mobile phase comprises an eluent. Thus, the background component data is obtained through measurement of the mobile phase without the introduction of analyte. In embodiments, the chromatography apparatus comprises one or more port to which a sample may be connected in use for analysis, and the step of providing the library data is performed without connection of a sample to any one of the ports. Passing a mobile phase e.g. eluent through a chromatography apparatus may comprise driving e.g. pumping the mobile phase e.g. eluent therethrough. For example, in liquid chromatography techniques, an eluent may be driven e.g. pumped therethrough. The eluent may comprise a solvent that is pumped through the apparatus, e.g. from one or more source. Each source may be associated with a given one of a plurality of solvent components (each component may then be pumped through the apparatus). A mobile phase e.g. eluent, such as a carrier gas, may similarly be driven through the apparatus in a gas chromatography technique. Passing the mobile phase e.g. eluent through the apparatus may, alternatively, involve allowing the mobile phase e.g. eluent to be drawn into and through the apparatus e.g. by vacuum.

Thus, the step of providing the library of background component data may comprise passing a mobile phase through a chromatographic separation apparatus and performing measurements on the mobile phase under each one of the set of one or more different chromatographic conditions to determine background component data for each chromatographic condition, wherein the mobile phase comprises an eluent, and the measurements of the mobile phase to determine the background component data are performed without the introduction of a sample comprising an analyte to the mobile phase.

It will be appreciated that the background component data for the library may be obtained through measurement of the mobile phase while the mobile phase is passed through the same chromatography apparatus which is used in the subsequent separation of a sample. Thus, in some embodiments, the chromatography apparatus used in obtaining the library of background component data is the same as the apparatus used in the chromatographic separation of the sample. However, this is not necessarily the case. It has been found that at least some of the background component data obtained for a library through measurement of a mobile phase when passed through a given chromatography apparatus under a plurality of different chromatographic conditions will be applicable i.e. at least some of the background components may be expected to be present, when a sample is chromatographically separated under one or more of the same chromatographic conditions using a different chromatography apparatus. The apparatus will, of course, be of the same generic type e.g. liquid or gas chromatography apparatus, such that the same chromatographic condition will arise e.g. a condition in respect of a solvent composition or column temperature etc. Thus, the eluent of the mobile phase will typically be the same. It has been found that even background components arising from contaminants which have leached out of plastic or glass components of the apparatus may be common to multiple different apparatus, since similar materials tend to be used. For example, certain plasticisers etc., are ubiquitous. In embodiments, the chromatography apparatus used in obtaining the library of background component data and the apparatus used in the chromatographic separation of the sample are each a liquid chromatography apparatus or are each a gas chromatography apparatus (and may or may not be the same apparatus).

In other embodiments, the background component data may be specific to a particular chromatographic separation apparatus. The library of background component data may be provided in respect of a given chromatographic separation apparatus, the background component data comprising, for each one of the set of a plurality of different chromatographic conditions, one or more physico-chemical properties of one or more background components expected to be detected when performing chromatographic separation using the apparatus under the condition, and the chromatographic separation of the sample is performed using the same apparatus.

The measured background component data may be measured by a mass spectrometer. The chromatography apparatus may form part of the mass spectrometer. The method may comprise using e.g. controlling the mass spectrometer to provide the library of matrix data.

The step of providing the library may be performed as an initial step prior to analysing a sample. The step may be performed as a preparatory step. A chromatography apparatus may be set up, and library data obtained in relation to at least some of the chromatographic conditions which are to be used in the subsequent sample analysis. The library data may be specific to a particular experiment which is to performed using the apparatus. However, this need not be the case. It has been found that at least some of the background component data that is measured in respect of each one of a plurality of chromatographic conditions may be applicable whenever one of those conditions is subsequently used in the analysis of a sample, even where this is using a different apparatus, and/or at a later time. The library data provides an internal reference library.

The library comprises background component data for each one of a plurality of different chromatographic conditions. The library may comprise background component data in respect of a plurality of different background components, and optionally a plurality of different background components under each one of the plurality of different chromatographic conditions. A comprehensive library of background data may be built up to enable one or more background components to be identified in a subsequent experiment analysing a sample. By including more background data in the library, relevant to different chromatographic conditions, and/or multiple components under one or more, or each of the different conditions, the library data may be applicable more widely to a variety of subsequent experiments, provided that they involve the use of at least some e.g. one or more of the chromatographic conditions to which the background data relates. The background data may enable multiple background components to be identified in the subsequent output data, and used in obtaining error values. In embodiments, the library comprises background component data for each one of a plurality of different chromatographic conditions, and, for each chromatographic condition, in respect of a plurality of background components.

Thus, the library may comprise, for each one of a plurality of different chromatographic conditions, background component data in respect of a plurality of different background components.

The set of a plurality of chromatographic conditions may be selected to correspond to conditions which are to be used in the subsequent chromatographic separation of a sample. The set of a plurality of chromatographic conditions may correspond to at least some of the chromatographic conditions to be used in the subsequent chromatographic separation of a sample. However, the conditions may be selected in any manner. If background data is obtained in relation to a wider selection of conditions, the library may be more widely applicable to a variety of future experiments, whatever conditions are used therein. Each chromatographic condition may be defined by a set of one or more parameters. A value of at least one, and optionally only one parameter of the set of one or more parameters defining the chromatographic condition may differ between the different chromatographic conditions (or as the conditions are varied).

The step of providing the library of background component data may comprise varying a chromatographic condition while passing the mobile phase through the chromatography apparatus, and measuring background component data in respect of a plurality of different chromatographic conditions. The method may comprise varying a parameter of a set of one or more parameters defining a chromatographic condition while the mobile phase is passed through the chromatography apparatus, and determining background component data for a plurality of different values of the parameter defining the chromatographic condition to obtain the background component data. The chromatographic condition e.g. the parameter thereof may be varied between a starting point and an end point. The condition e.g. parameter thereof may be varied in a continuous or step-wise manner. In embodiments, in contrast to the case when analysing a sample, when obtaining the library data, a number of different chromatographic conditions may be set up, and the background component data obtained in respect of each condition, rather than varying the condition e.g. continually over a range of values. This may enable steady state conditions to be reached. For example, a parameter defining the chromatographic condition may simply be set to a number of discrete values. The different chromatographic conditions in respect of which background component data is measured (e.g. the discrete values of a parameter defining the chromatographic condition) may optionally be determined by performing an initial survey experiment to assess the dependence of background components on chromatographic conditions.

Thus, the step of providing the library of background component data may comprise varying a chromatographic condition while passing the mobile phase through the chromatography apparatus, and determining background component data for each one of a plurality of different chromatographic conditions.

The method may comprise passing the mobile phase through the chromatography apparatus continuously while determining the background component data in respect of a given one of the plurality of chromatographic conditions, and optionally throughout the process of obtaining the background component data in respect of each of the plurality of different chromatographic conditions. The measurement of the background components in respect of each one of the plurality of different chromatographic conditions may be performed under steady state conditions. The measurement of the mobile phase to obtain the background component data in respect of each of the plurality of chromatographic conditions is performed without the introduction of a sample. No sample is introduced during the process of obtaining the library data.

For example, steady state conditions may be conditions under which the solvent composition is fixed. The column of the apparatus will typically be at a constant temperature. For gas chromatography, under steady state conditions, both the stationary and mobile phase are invariant in temperature, and the mobile phase composition is constant (although typically the carrier gas includes only one gas component). The column may be at different temperatures in different regions, e.g. may exhibit a temperature gradient, but the temperature, or temperature gradient, is not changing with time.

In embodiments the method comprises holding the chromatographic condition static while measuring the background component data for each one of the plurality of different chromatographic conditions e.g. each value of a parameter defining the condition. The measurement may be performed under steady state conditions. As the library data is obtained without introducing a sample, it is possible to hold the chromatographic condition static for as long as desired or necessary, to obtain background component data. This is in contrast to techniques described in GB 2536536 (Micromass), in which a library of matrix data is obtained for use in correcting sample data. As the matrix is part of a sample, obtaining library data in respect of matrix components must be performed in the context of analysing a sample. While chromatographic conditions may be varied during such a process, it is not possible to hold conditions static at any point in order to more accurately measure the matrix components. The sample is injected in a pulse at a given time, with the mixture then being separated as it passes through the chromatography apparatus, with each component of the mixture leaving the apparatus at a time defined by its retention time. The chromatographic conditions used during the separation typically vary according to a predefined program e.g. in a continual or stepwise manner between initial and final values. In contrast, in the embodiments disclosed herein, as the library data concerns background components, and is obtained in a separate, and specific step while the mobile phase is passed through a chromatography apparatus without the introduction of a sample, and prior to any sample analysis, it is possible to hold chromatographic conditions static for as long as needed to obtain careful measurements of detected background peaks. The mobile phase is passed through the apparatus while the measurements are performed. In contrast to the way in which a sample is pulsed into the chromatography apparatus for chromatographic separation, the mobile phase e.g. eluent is not pulsed i.e. during the measurement of the background. The mobile phase is continuously passed into the apparatus during background component measurement, and subsequently, during sample separation.

Thus, the method may comprise holding the chromatographic condition static while obtaining the background component data for each one of the plurality of different chromatographic conditions.

The background data for inclusion in the library may be obtained in any manner from the results of measuring the mobile phase under the plurality of different chromatographic conditions.

The method may comprise selecting a subset of detected background components for inclusion in the library. The subset may be selected from the complete set of components obtained at each of the set of a plurality of different chromatographic conditions. For example, those components which are selected may be selected based on any one or ones of, a degree of resolution of the one or more physico-chemical property, the dominance of the component e.g. a measured intensity, a level of confidence in the accuracy of the measured one or more physico-chemical property, the number of different chromatographic conditions under which the background peak is detected etc. It will be appreciated that a given background component may not be detected under all chromatographic conditions for which library data is obtained. The step of measuring the mobile phase may comprise obtaining one or more mass spectrum under each one of the set of a plurality of chromatographic conditions, and identifying one or more background components for inclusion in the library in respect of each condition from the obtained mass spectra. The library may comprise, for each one of the set of a plurality of different chromatographic conditions, data indicative of the chromatographic condition, and, associated therewith, data indicative of the one or more physico-chemical properties of the or each background component expected to be detected under the condition. The one or more physico-chemical properties of the or each background component may be or include a mass to charge ratio of the component. The chromatographic condition data associated with background component data may be used in identifying a retention time or retention time period at which the background component may be expected to be found in output data obtained through analysing a sample. While the physico-chemical properties e.g. mass to charge ratio of a background component will generally be independent of chromatographic condition, or hence retention time in the output data where such conditions are varied, whether or not the component will be found at all will depend upon the chromatographic condition, and hence retention time in the output data. The method may comprise storing the obtained background component data to provide the library. Conversely, the library may comprise, for each one of the one or more background components expected to be detected when performing chromatographic separation under a condition, data indicative of the one or more physico-chemical properties of the background component, and data indicative of the chromatographic condition under which the component is expected to be detected associated therewith.

Thus, the step of measuring the mobile phase to obtain the background component data in respect of each chromatographic condition may comprise obtaining one or more mass spectrum under each one of the set of a plurality of chromatographic conditions, and identifying one or more background components in respect of each chromatographic condition for inclusion in the library. The physico-chemical data in respect of the or each background component may be a mass to charge ratio.

In some embodiments each one of the set of one or more different chromatographic conditions is a different temperature setting of a separation column of a chromatography apparatus. The parameter which is varied between the different conditions may then be the temperature of the column. The one or more chromatography apparatus used in obtaining the library data and sample data are then each a gas chromatography apparatus.

Thus, the chromatographic separation apparatus used in providing the library of background component data may be a gas chromatographic separation apparatus comprising a separation column, and the mobile phase may comprise a carrier gas, and each one of the set of one or more different chromatographic conditions may be a different temperature setting of the separation column of the chromatographic separation apparatus.

In other embodiments, the each one of the set of one or more different chromatographic conditions is a different composition of an eluent of the mobile phase. The one or more chromatography apparatus used in obtaining the library data and sample data may then be a liquid chromatography apparatus. In embodiments the mobile phase e.g. eluent comprises a solvent, and each chromatographic condition is a different composition of the solvent. The step of varying a composition of the eluent may comprise varying a composition of the eluent e.g. solvent. This may be referred to as performing gradient elution. The parameter may then be a composition of the eluent e.g. a solvent ratio. In embodiments, the solvent comprises a plurality of different solvent components, and the method comprises varying the ratio of the components of the solvent e.g. between a starting point and an end point. Library data may be obtained in respect of multiple different solvent ratios. In embodiments there are two different solvent components. For example, the solvents may be aqueous and organic solvents respectively. The solvent ratio of the two components may be varied in the range of from 1:0 to 0:1. For obtaining background component data for the library, the ratio may be set to one or more, optionally a plurality, of different values within this range for background component measurement. However it is envisaged that there may be three, or even more solvent components. The solvent composition may be varied in accordance with a solvent gradient.

Thus, the chromatographic separation apparatus used in providing the library of background component data may be a liquid chromatographic separation apparatus, and the mobile phase may comprise a solvent, each one of the set of one or more different chromatographic conditions may be a different composition of the solvent, optionally wherein the solvent comprises multiple components, and the composition of the solvent is a ratio of the solvent components.

It will be appreciated that other chromatographic conditions may be used that may have an impact on the background components measured. For example, it is envisaged that each different chromatographic condition may be a different pH of the eluent. Background component data may be obtained for different pH levels of the eluent. The pH level may be varied e.g. according to a gradient. Any condition which may be varied to change the background components measured may be used.

A chromatographic condition which is varied (or a value of a parameter defining a chromatographic condition which is varied) may be a solvent/eluent composition e.g. ratio of a solvent/eluent, or a temperature of a column etc. It will be appreciated that the background component data in the library is obtained through measurement, rather than a theoretical calculation. The eluent in respect of which the background component data for the library is obtained, and which is used in the subsequent separation of the sample may be the same type, and at least some of the time during the separation, may be of the same composition.

The chromatographic condition(s) in respect of which background component data is obtained and used to provide the library may be conditions which are expected to be used in the subsequent sample analysis. Thus, the library may optionally be provided specific to a particular sample analysis experiment that is to be performed e.g. as a preparatory step.

It will be appreciated that the method may comprise performing an initial measurement step in the absence of the sample to obtain the library data, and then performing the chromatographic separation of the sample. It is envisaged that an initial survey experiment may be performed prior to the obtaining of the library data, in order to identify major background components as a function of chromatographic conditions. This survey experiment may explore the way in which detected background ions depend upon chromatographic conditions, and help to identify the number and nature of chromatographic conditions to be included in the library. However, this is optional.

Some calibration may be performed of the mass spectrometer during or prior to obtaining the background component data for the library. This may help to compensate for any significant m/z drift.

The background component data in the library may comprise one or more physico-chemical properties of one or more background components in respect of at least 2, 3, 4 or 5 different chromatographic conditions.

The chromatographic separation of the sample may be performed under any chromatographic condition or conditions (e.g. a varying chromatographic condition, such as solvent ratio or column temperature), provided that the condition(s) include at least some e.g. one or more chromatographic condition in respect of which background data is provided in the library. Where the chromatographic separation is performed under one or more chromatographic condition which corresponds to i.e. is the same as, a chromatographic condition in respect of which library data has been obtained, it may be assumed that corresponding background components will be found in the output data obtained when analysing the sample.

The chromatographic separation of the sample may be performed under a plurality of different chromatographic conditions. The step of chromatographically separating the sample may comprise varying a chromatographic condition as chromatographic separation is performed. The method may comprise determining output data including sample data for a plurality of different chromatographic conditions e.g. values of a parameter of a set of one or more parameters defining the chromatographic condition. The chromatographic condition e.g. the parameter thereof may be varied between a starting point and an end point. The condition e.g.

parameter may be varied in a continuous or step-wise manner. Varying of the chromatographic condition may be performed in any of the manners described in relation to obtaining the background component data for the library, although will typically will not be held static for periods of time at different conditions, or at least for such long periods of time, with conditions instead being varied in a more continual manner and/or at a faster rate. The condition may be varied in accordance with a program. The condition may be varied at different rates throughout the separation, depending upon the program selected.

In some embodiments the chromatographic separation is a gas chromatographic separation, and each one of the set of a plurality of different chromatographic conditions under which separation of the sample is performed is a different temperature setting of a separation column of the chromatographic separation apparatus. The parameter which is varied between the different conditions may then be the temperature of the column.

In general, the different chromatographic conditions may be provided by varying the mobile phase (e.g. eluent), e.g. by varying a composition thereof.

In other embodiments, the chromatographic separation is a liquid chromatographic separation, and each one of the set of a plurality of different chromatographic conditions under which separation of the sample is performed is a different composition of the eluent. In embodiments the eluent comprises a solvent, and each chromatographic condition is a different composition of the solvent. The step of varying a composition of the eluent may comprise varying a composition of the eluent e.g. solvent. This may be referred to as performing gradient elution. The parameter may then be a composition of the eluent e.g. a solvent ratio. In embodiments, the solvent comprises a plurality of different solvent components, and the method comprises varying the ratio of the components of the solvent e.g. between a starting point and an end point. In embodiments there are two different solvent components. For example, the solvents may be aqueous and organic solvents respectively. The solvent ratio of the two components may be varied in the range of from 1:0 to 0:1. However it is envisaged that there may be three, or even more solvent components. The solvent composition may be varied in accordance with a solvent gradient.

The method may comprise using a mass spectrometer to analyse the sample (i.e. to provide the output data). The mass spectrometer may comprise the chromatography apparatus used to separate the sample. The mass spectrometer may or may not be the same mass spectrometer used to obtain the library data.

The output data obtained by analysing the sample will include sample data and background component data. The background component data comprises one or more physico-chemical properties of one or more background components as a function of retention time. It will be appreciated that a given background component may or may not appear over the full range of retention times associated with the output data.

The step of calculating one or more error values may comprise determining a difference, in respect of a particular retention time or retention time period, between a physico-chemical property of a background component identified in the output data (e.g. as measured using the mass spectrometer), and a corresponding physico-chemical property of the background component according to the library data. It will be appreciated that the error in respect of a particular background component may be dependent upon retention time. The physico-chemical property of the background component according to the library data may be independent of the chromatographic condition used in obtaining the background component data.

Thus, the step of calculating one or more error values may comprise determining, for one or more background component identified in the output data, a difference, in respect of one or more retention time or retention time period, between a physico-chemical property of the background component identified in the output data and a corresponding physico-chemical property of the background component according to the library data.

The comparison between the one or more background components in the output data and the background component data from the library may be a comparison between one or more physico-chemical properties of one or more background components in the output data with the same one or more physico-chemical properties of the same background components in the library data. The physico-chemical property is optionally mass to charge ratio.

The one or more error values are calculated based on a comparison, for one or more retention times or retention time periods, between one or more background components identified in the output data and corresponding background component data obtained from the library of background component data. The comparison may be, for each identified background component, a comparison between the identified background component and data relating to the same background component selected from the library. It will be appreciated that the chromatographic condition applicable at each retention time or retention time period will be derivable based on knowledge of the way in which the chromatographic condition was varied (if varied) during the chromatographic separation of the sample e.g. based on a program used to control the condition.

The method may comprise identifying a set of one or more components e.g. peaks in the output data for the or each retention time or retention time period which correspond to a background component e.g. peak. The method may comprise using only a subset of the identified components e.g. peaks in calculating the one or more error values. The method may comprise discarding a remainder of the components or peaks. The discarded components e.g. peaks may be components e.g. peaks which are deemed to be in error, and/or inconsistent with other data. For example, outliers, corrupted measurements and inconsistent measurements at specific retention times may be rejected. Signals may be deemed corrupted or unreliable if they are assessed as suffering from m/z interference or detector saturation, or are below a preset intensity value. Outliers and inconsistent peaks may be identified as measurements which are not consistent, within calculated statistical precision, with the other measurements at the same retention time or at a retention time immediately before or after the specific retention time.

Identifying a background component in the output data may be carried out in any suitable manner. The step of identifying a background component may comprise selecting a given background component in respect of a given chromatographic condition from the library, wherein the chromatographic condition is a condition used in the chromatographic separation of the sample, and searching for the background component in the output data. The step of searching for the background component may comprise using the chromatographic condition with which the background component is associated in the library data to identify one or more retention time or retention time period of the output data at which the background component is expected to appear. The method may comprise identifying the or each background component in the output data at multiple retention times. It is envisaged that instead, background components may be identified in the output data without reference to the library data, with the comparison to the library data to obtain the one or more error values then being made.

The method may comprise using at least some, and optionally all of the background component data in the library in calculating the one or more error values. In embodiments in which the background component data in the library is in respect of a plurality of chromatographic conditions, each of which is used in the separation of the sample, all of the background component data may be used. It is not necessary to look for certain background components in respect of certain subsets of the output data e.g. relating to particular retention times, as it may be assumed that all background components should be encountered somewhere. However, in some embodiments, the step of identifying a background component in the output data comprises using a chromatographic condition associated with a background component from the library to identify a retention time or retention time period at which the background component is expected to appear in the output data. This may help to avoid false positives, as only background components which are expected to be found in the output data in a particular retention time period will be sought.

The step of calculating one or more error values as a function of retention time may involve determining an error value for each of one or more background components as a function of retention time. The method may comprise determining an error value in respect of each one of a plurality of background components identified in the output data as a function of retention time and determining an overall error value as a function of retention time based on the error values for each of individual background components. This may be carried out using some form of averaging or summing etc. It is advantageous to take into account multiple background components, as not all components will necessarily appear at each retention time.

The library data may comprise one or more physico-chemical properties of a plurality of different background components (for the same or different chromatographic conditions), and the step of calculating one or more error values may comprise calculating a plurality of error values as a function of retention time, wherein each error value is optionally in respect of a different background component. The library of background component data may comprise one or more physico-chemical properties of a plurality of different background components as a function of retention time, and the step of calculating one or more error values may comprise calculating a plurality of error values as a function of retention time, wherein each error value is in respect of a different background component identified in the output data.

The one or more error values calculated may be used in various manners.

The method according to various embodiments optionally further comprises calculating one or more adjustment or correction values based on the one or more error value. The one or more adjustment or correction values may be associated with a respective retention time, mass, mass to charge ratio or other physico-chemical property.

The step of calculating one or more adjustment or correction values may comprise plotting or calculating a plurality of error values as a function of retention time, and optionally determining the adjustment or correction values from the plot.

The step of calculating an adjustment or correction value may comprise plotting or determining a plurality of error values as a function of retention time and determining the adjustment or correction values from a line of fit associated with the plot or determination of error values as a function of retention time.

Each error, adjustment or correction value may be recorded with a corresponding retention time and/or physico-chemical property, for example mass, mass to charge ratio, drift time, collision cross section ("CCS"), interaction cross section, ion mobility or differential ion mobility.

The method according to various embodiments may further comprise adjusting or correcting mass spectral data, for example mass to charge ratio values, associated with the sample using the one or more adjustment or correction values. The adjusting or correcting mass spectral data may comprise identifying a mass spectra at a given retention time, calculating an adjustment or correction value at the retention time as described above, and applying this adjustment or correction value to the mass spectra. The adjustment or correction value may comprise ppm error or correspond to a shift value for the spectrum.

The error, adjustment or correction values may be calculated by identifying, for a given retention time, one or more mass to charge ratio peaks in the output data that correspond to background component peaks, and comparing the respective values associated with those peaks (e.g., intensity, mass to charge ratio) to the values that are stored in the library for those particular background component peaks under the chromatographic condition applicable at the given retention time, and calculating the error, adjustment or correction value from the difference between the output data and the library values. Typically, a number of background peaks will be identified for a particular retention time or retention time period, and the error, adjustment or correction value at a particular retention time or retention time period may be calculated from a plurality of background peaks (e.g., at least 2, 4, or 5), for example an average value could be used.

The method according to various embodiments may further comprise adjusting or correcting one or more instrument parameters using the adjustment or correction value e.g. parameters of a or the mass spectrometer.

The one or more instrument parameters may comprise one or more of detector gain, transmission efficiency, ionisation efficiency, time of flight voltage and reflectron voltage.

The step of calculating the one or more error values, and/or the step of adjusting or correcting may be performed in real time or as a post-processing technique.

The error values may be used to modify or amend a calibration or calibration model. For example, the difference between the physico-chemical property of the background component in the output data and the physico-chemical property of the background component in the library data may be used to modify or amend a calibration or calibration model. The calibration model may be amended as a function of retention time, that is the modification or amendment may be applied to the calibration or calibration model as a function of retention time. The calibration or calibration model may be amended at each retention time or retention time period.

Unless the context demands otherwise, any of the physico-chemical properties described herein may comprise one or more of mass, mass to charge ratio, drift time, collision cross section ("CCS"), interaction cross section, ion mobility and differential ion mobility.

Any of the physico-chemical properties described herein may be or comprise intensity or abundance.

The error value and/or plurality of error values and/or adjustment or correction value may be used to correct mass spectral data relating to said analyte components. The known or determined background components may be used as a lock mass for the analyte components.

The sample may be analysed using a mass spectrometer. The method may further comprise introducing a reference or lock mass component into said mass spectrometer during an experimental run if the one or more error values exceed a defined limit. The reference may comprise an internal or external standard. The reference or lock mass may be introduced into the mass spectrometer with or separately to said sample. The reference or lock mass component may interrupt the flow or introduction of said sample into said mass spectrometer.

The method may further comprise introducing a reference or lock mass component into a or the mass spectrometer during an experimental run if said one or more error values exceed a defined limit.

The sample that is chromatographically separated may further comprise one or more matrix components. The method may further comprise mixing the matrix components and the analyte components to form said sample e.g. prior to mixing said sample with a solvent. The method may further comprise mixing the matrix components and the analyte components to form said sample prior to separating said sample.

The output data may be obtained during one or more analytical runs.

A plurality of samples may be provided, one of which may be the sample described above. Where each sample is separated such that at least some of the separation is performed under a chromatographic condition in respect of which background data is provided in the library, the steps of analysing the sample and calculating one or more error values may be repeated for additional samples taken from the plurality of samples.

Background components are referred to herein may be background ions. Background ions may be elementary, molecular or fragment ions, or any combination thereof. For example, where an $MS^E$ technique (also referred to as Shotgun) is used, in which, as an analyte elutes, the instrument repeatedly switches between a fragmentation mode and a non-fragmentation mode, the resulting detected ions may include parent and fragment ions.

The one or more physico-chemical properties referred to herein, in relation to the background components in the library data, or the analysed sample, may, unless the context demands otherwise, be or include mass to charge ratio. Instead of or in addition to mass to charge ratio, other physico-chemical properties could be used such as one or more of drift time, collision cross section ("CCS"), interaction cross section, ion mobility or differential ion mobility.

While the aspects and embodiments described herein determine background component data in respect of each one of a plurality of different chromatographic conditions, this need not be the case, and it is envisaged that the background component data may be in respect of only one chromatographic condition. Thus, the background component data in the library may be provided in respect of each one of a set of a plurality of different chromatographic conditions. The library data may comprise background component data in respect of multiple background components and/or multiple chromatographic conditions. Thus, where data is included only in respect of one chromatographic condition, data is then provided in respect of multiple background components at the condition.

Thus, according to an aspect of the present disclosure there is provided a method comprising:
  providing a library of measured background component data, the measured background component data comprising, for each one of one or more chromatographic conditions, one or more physico-chemical properties of one or more background components expected to be detected when performing chromatographic separation under the condition;
  chromatographically separating a sample, the sample containing one or more analyte components, wherein at least some of the chromatographic separation is performed under a chromatographic condition in respect of which background component data is provided in the library;
  obtaining output data including sample data comprising one or more physico-chemical properties of one or more sample components as a function of retention time;
  and calculating one or more error values based on a comparison between one or more background components identified in the output data and background component data obtained from the library of background component data.

These aspects and embodiments can, and in various embodiments do, include any one or more or all of the optional features described above and elsewhere herein.

The step of providing the library of background component data may comprise passing a mobile phase through a chromatographic separation apparatus and performing one or more measurements on the mobile phase under each one of the one or more chromatographic conditions to determine background component data for each chromatographic condition.

The one or more measurements of the mobile phase to determine the background component data may be performed without the introduction of a sample comprising an analyte to the mobile phase.

The one or more measurements of the mobile phase to determine the background component data may be performed after introduction of a sample comprising an analyte to the mobile phase but before the sample and/or analyte has started to elute from the chromatographic separation apparatus.

The chromatographic separation apparatus used in providing the library of background component data may be a liquid chromatographic separation apparatus, and the mobile phase may comprise a solvent, each one of the one or more chromatographic conditions being a composition of the solvent, optionally wherein the solvent comprises multiple components, and the composition of the solvent is a ratio of the solvent components.

The chromatographic separation apparatus used in providing the library of background component data may be a gas chromatographic separation apparatus comprising a separation column, and the mobile phase may comprise a carrier gas, and each one of the one or more chromatographic conditions may be a temperature setting of the separation column of the chromatographic separation apparatus.

The step of providing the library of background component data may comprise varying a chromatographic condition while passing the mobile phase through the chromatography apparatus, and determining background component data for each one of a plurality of different chromatographic conditions.

The method may comprise holding the chromatographic condition static while obtaining the background component data for each one of the one or more chromatographic conditions.

The library may comprise, for each one of one or more chromatographic conditions, background component data in respect of a plurality of different background components.

The step of measuring the mobile phase to obtain the background component data in respect of each chromatographic condition may comprise obtaining one or more mass spectrum under each one of the one or more chromatographic conditions, and identifying one or more background components in respect of each chromatographic condition for inclusion in the library.

The physico-chemical property in respect of the or each background component may be a mass to charge ratio.

The step of calculating one or more error values may comprise determining, for one or more background component identified in the output data, a difference between a physico-chemical property of the background component identified in the output data and a corresponding physico-chemical property of the background component according to the library data.

The library of background component data may comprise one or more physico-chemical properties of a plurality of different background components, and the step of calculating one or more error values may comprise calculating a plurality of error values, wherein each error value is in respect of a different background component identified in the output data.

The step of calculating one or more error values may comprise calculating one or more error values based on a comparison between one or more background components identified in output data obtained under a single chromatographic condition and background component data obtained from the library of background component data, optionally wherein the single chromatographic condition occurs at least twice during the chromatographic separation.

The single chromatographic condition may be a chromatographic condition, such as a solvent composition, that occurs at the start and/or end of the chromatographic separation.

The step of providing the library of background component data may comprise performing one or more measurements on the mobile phase under an initial chromatographic condition of the chromatographic separation to determine background component data for the initial chromatographic condition, optionally during the chromatographic separation of the sample.

The method may comprise calculating one or more adjustment or correction values based on the one or more error values.

The step of calculating one or more adjustment or correction values may comprise plotting or calculating a plurality of error values as a function of retention time and determining the adjustment or correction values from the plot or calculation.

The step of calculating one or more adjustment or correction values may comprise plotting or calculating a plurality of error values as a function of retention time and determining the adjustment or correction value from a line of fit or interpolation associated with the plot or calculation of the plurality of error values.

The method may comprise adjusting or correcting mass spectral data associated with the sample using the adjustment or correction values.

The method may comprise adjusting or correcting one or more instrument parameters using the adjustment or correction values.

References to "a function of retention time" may be interpreted to mean that the values proposed are given with an associated retention time or retention time period. For example, an error value may be calculated for a period of time corresponding to a retention time period, or for a single value of retention time. The correction applied may be to mass spectra that are produced within the retention time period. Alternatively, the mass spectra within a retention time period may be summed and the correction applied to the summed mass spectrum.

The library data may be stored in any suitable database.

The methods described herein may be performed using one or more mass spectrometer. The library of measured background component data may be data measured using a mass spectrometer. The one or more physico-chemical properties of one or more background components expected to be detected under a given chromatographic condition are measured using the mass spectrometer. The step of analysing the sample may be performed by a mass spectrometer, which may be the same as the mass spectrometer used in obtaining the library data, although this need not be the case. The mass spectrometer may comprise the chromatography apparatus arranged and adapted to chromatographically separate a sample.

According to an aspect of the present disclosure there is provided a mass spectrometer comprising:

a chromatography apparatus arranged and adapted to chromatographically separate a sample;

wherein the mass spectrometer is arranged and adapted to analyse the sample at one or more retention times to obtain sample data, the sample data comprising one or more physico-chemical properties of one or more sample components as a function of retention time.

The mass spectrometer may comprise a control system arranged and adapted to perform the steps of at least a part, or all of any one of the methods described herein.

The control system may be arranged and adapted to obtain data from a library of measured background component data, the measured background component data comprising, for each one of a set of a plurality of different chromatographic conditions, one or more physico-chemical properties of one or more background components expected to be detected when performing chromatographic separation under the condition;

to cause the chromatography apparatus to chromatographically separate a sample, the sample containing one or more analyte components, wherein at least some of the chromatographic separation is performed under a chromatographic condition in respect of which background component data is provided in the library;

to cause the mass spectrometer to analyse the sample to obtain output data including sample data comprising one or more physico-chemical properties of one or more sample components as a function of retention time;

and to calculate one or more error values as a function of retention time based on a comparison between one or more background components identified in the output data (i.e. as measured by the mass spectrometer) and background component data obtained from the library of background component data.

The control system may be arranged and adapted to obtain data from a library of measured background component data, the measured background component data comprising, for each one of one or more chromatographic conditions, one or more physico-chemical properties of one or more background components expected to be detected when performing chromatographic separation under the condition;

to cause the chromatography apparatus to chromatographically separate a sample, the sample containing one or more analyte components, wherein at least some of the chromatographic separation is performed under a chromatographic condition in respect of which background component data is provided in the library;

to cause the mass spectrometer to obtain output data including sample data comprising one or more physico-chemical properties of one or more sample components as a function of retention time;

and to calculate one or more error values based on a comparison between one or more background components identified in the output data and background component data obtained from the library of background component data.

The control system may be arranged to provide the library data in accordance with any of the methods previously described. The technology described in relation to this further aspect may include any or all of the features described in relation to the earlier aspects and embodiments, and vice versa. Thus, the control system may be arranged and adapted to perform any of the steps previously described. It will be appreciated that, in embodiments, the library data may be obtained by a different mass spectrometer, in which case the step of obtaining library data may comprise accessing the library data, or the method may extend to the control system controlling the mass spectrometer to provide the library data in accordance with any of the methods described herein. The control system may control the mass spectrometer to provide the library data automatically, or under the control of a user. The step of obtaining the library data may comprise the control system accessing or providing the library data.

The spectrometer may comprise an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; (xxviii) a Laser Ablation Electrospray Ionisation ("LAESI") ion source; and (xxix) Surface Assisted Laser Desorption Ionisation ("SALDI").

The spectrometer may comprise one or more continuous or pulsed ion sources.

The spectrometer may comprise one or more ion guides.

The spectrometer may comprise one or more ion mobility separation devices and/or one or more Field Asymmetric Ion Mobility Spectrometer devices.

The spectrometer may comprise one or more ion traps or one or more ion trapping regions.

The spectrometer may comprise one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device.

The spectrometer may comprise a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser.

The spectrometer may comprise one or more energy analysers or electrostatic energy analysers.

The spectrometer may comprise one or more ion detectors.

The spectrometer may comprise one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter.

The spectrometer may comprise a device or ion gate for pulsing ions; and/or a device for converting a substantially continuous ion beam into a pulsed ion beam.

The spectrometer may comprise a C-trap and a mass analyser comprising an outer barrel-like electrode and a coaxial inner spindle-like electrode that form an electrostatic field with a quadro-logarithmic potential distribution, wherein in a first mode of operation ions are transmitted to the C-trap and are then injected into the mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the mass analyser.

The spectrometer may comprise a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

The spectrometer may comprise a device arranged and adapted to supply an AC or RF voltage to the electrodes.

The spectrometer may comprise the chromatographic separation apparatus used in the embodiments described herein upstream of an ion source.

Analyte ions may be subjected to Electron Transfer Dissociation ("ETD") fragmentation in an Electron Transfer Dissociation fragmentation device. Analyte ions may be caused to interact with ETD reagent ions within an ion guide or fragmentation device.

Optionally, in order to effect Electron Transfer Dissociation either: (a) analyte ions are fragmented or are induced to dissociate and form product or fragment ions upon interacting with reagent ions; and/or (b) electrons are transferred from one or more reagent anions or negatively charged ions to one or more multiply charged analyte cations or positively charged ions whereupon at least some of the multiply charged analyte cations or positively charged ions are induced to dissociate and form product or fragment ions; and/or (c) analyte ions are fragmented or are induced to dissociate and form product or fragment ions upon interacting with neutral reagent gas molecules or atoms or a non-ionic reagent gas; and/or (d) electrons are transferred from one or more neutral, non-ionic or uncharged basic gases or vapours to one or more multiply charged analyte cations or positively charged ions whereupon at least some of the multiply charged analyte cations or positively charged ions are induced to dissociate and form product or fragment ions; and/or (e) electrons are transferred from one or more neutral, non-ionic or uncharged superbase reagent gases or vapours to one or more multiply charged analyte cations or positively charged ions whereupon at least some of the multiply charge analyte cations or positively charged ions are induced to dissociate and form product or fragment ions; and/or (f) electrons are transferred from one or more neutral, non-ionic or uncharged alkali metal gases or vapours to one or more multiply charged analyte cations or positively charged ions whereupon at least some of the multiply charged analyte cations or positively charged ions are induced to dissociate and form product or fragment ions; and/or (g) electrons are transferred from one or more neutral, non-ionic or uncharged gases, vapours or atoms to one or more multiply charged analyte cations or positively charged ions whereupon at least some of the multiply charged analyte cations or positively charged ions are induced to dissociate and form product or fragment ions, wherein the one or more neutral, non-ionic or uncharged gases, vapours or atoms are selected from the group consisting of: (i) sodium vapour or atoms; (ii) lithium vapour or atoms; (iii) potassium vapour or atoms; (iv) rubidium vapour or atoms; (v) caesium vapour or atoms; (vi) francium vapour or atoms; (vii) $C_{60}$ vapour or atoms; and (viii) magnesium vapour or atoms.

The multiply charged analyte cations or positively charged ions may comprise peptides, polypeptides, proteins or biomolecules.

Optionally, in order to effect Electron Transfer Dissociation: (a) the reagent anions or negatively charged ions are derived from a polyaromatic hydrocarbon or a substituted polyaromatic hydrocarbon; and/or (b) the reagent anions or negatively charged ions are derived from the group consisting of: (i) anthracene; (ii) 9,10 diphenyl-anthracene; (iii) naphthalene; (iv) fluorine; (v) phenanthrene; (vi) pyrene; (vii) fluoranthene; (viii) chrysene; (ix) triphenylene; (x) perylene; (xi) acridine; (xii) 2,2' dipyridyl; (xiii) 2,2' biquinoline; (xiv) 9-anthracenecarbonitrile; (xv) dibenzothiophene; (xvi) 1,10'-phenanthroline; (xvii) 9' anthracenecarbonitrile; and (xviii) anthraquinone; and/or (c) the reagent ions or negatively charged ions comprise azobenzene anions or azobenzene radical anions.

The process of Electron Transfer Dissociation fragmentation may comprise interacting analyte ions with reagent ions, wherein the reagent ions comprise dicyanobenzene, 4-nitrotoluene or azulene.

A chromatography detector may be provided, wherein the chromatography detector comprises either:

a destructive chromatography detector optionally selected from the group consisting of (i) a Flame Ionization Detector (FID); (ii) an aerosol-based detector or Nano Quantity Analyte Detector (NQAD); (iii) a Flame Photometric Detector (FPD); (iv) an Atomic-Emission Detector (AED); (v) a Nitrogen Phosphorus Detector (NPD); and (vi) an Evaporative Light Scattering Detector (ELSD); or a non-destructive chromatography detector optionally selected from the group consisting of: (i) a fixed or variable wavelength UV detector; (ii) a Thermal Conductivity Detector (TCD); (iii) a fluorescence detector; (iv) an Electron Capture Detector (ECD); (v) a conductivity monitor; (vi) a Photoionization Detector (PID); (vii) a Refractive Index Detector (RID); (viii) a radio flow detector; and (ix) a chiral detector.

The spectrometer may be operated in various modes of operation including a mass spectrometry ("MS") mode of operation; a tandem mass spectrometry ("MS/MS") mode of operation; a mode of operation in which parent or precursor ions are alternatively fragmented or reacted so as to produce fragment or product ions, and not fragmented or reacted or fragmented or reacted to a lesser degree; a Multiple Reaction Monitoring ("MRM") mode of operation; a Data Dependent Analysis ("DDA") mode of operation; a Data Independent Analysis ("DIA") mode of operation a Quantification mode of operation or an Ion Mobility Spectrometry ("IMS") mode of operation.

The chromatography separation apparatus used herein may comprise a liquid chromatography or gas chromatography device. Alternatively, the separation apparatus may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

It will be appreciated that any reference to a chromatographic condition herein, may be replaced by a reference to an eluent composition or pH, or, for liquid chromatography arrangements, a solvent composition e.g. solvent ratio (between two or more solvent components), or, for gas chromatography arrangements, a column temperature. Different chromatographic conditions may be different ones of any one of these conditions, and varying the chromatographic condition may involve varying any one of these conditions.

The library data may be stored as a database. It should be noted that the phrase "associated therewith" should not be interpreted to require any particular restriction on data storage positions. The phrase only requires that the data elements in question are identifiably related to one another. Therefore association may for example be achieved by means of a reference to a side file, potentially located in a remote server. Each data element may be considered to be associated with the other data element in the relationship.

It will be appreciated that, the technology in any of the aspects and embodiments described herein may include any of the features described in relation to any of the other aspects and embodiments described, to the extent they are not mutually exclusive.

BRIEF DESCRIPTION OF THE DRAWINGS

Various embodiments of the present disclosure will now be described, by way of example only, and with reference to the accompanying drawings in which.

DETAILED DESCRIPTION

Figure 1:
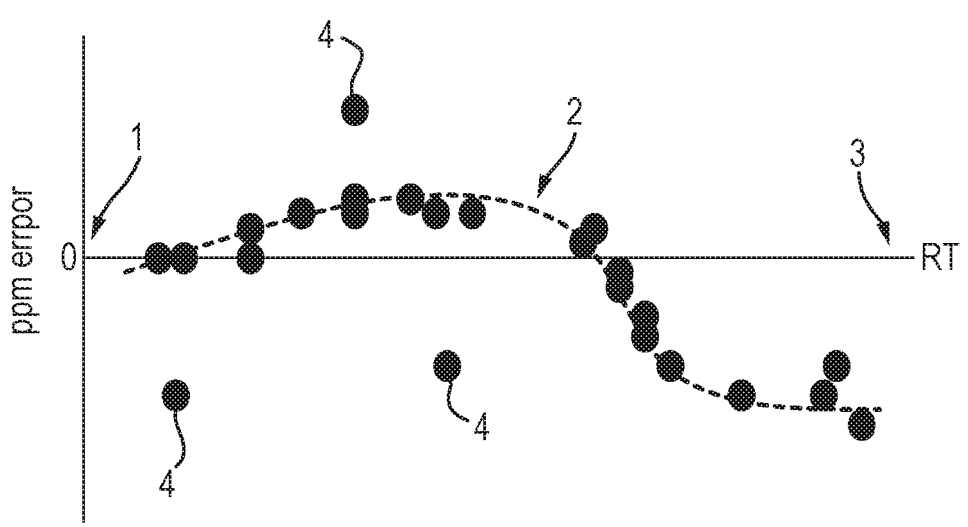
FIG. 1 is a simplified representation of a plot of ppm error as a function of retention time which may be obtained using the methods described herein.

It is known to use background ions from liquid chromatography (LC) eluent or column bleed as internal calibrants during a chromatographic separation. These background ions are used to correct for m/z drift during and between analysis. In the prior art, the identity of the background ions is determined allowing the exact m/z value to be calculated from the known elemental composition. However, in the case of LC, the background ions depend on the solvent composition which changes during the separation. In addition different solvent mixtures and/or additives may be used for different methods giving rise to different background ions at different points in the chromatographic elution sequence.

In many cases the majority of the background ions are of unknown elemental composition and hence their accurate m/z values cannot be directly calculated.

In LC separations, background ions can arise from the eluent e.g. solvent ions (such as solvent "clusters") or additives, as well as contamination of solvents and additives, contamination or bleeding of material from columns, fittings, tubing etc. or contamination of glassware. Additives may be added to the eluent to enhance ionisation efficiency, or to improve chromatographic separation. Additives may include ammonium acetate, formic acid, or acetic acid. For example, during an Electrospray Ionisation (ESI) process, clusters of solvent and/or analyte, and/or additive molecules may form ions. It will be seen that the background ions include ions that are added deliberately, and some which are not e.g. where the solvent or additives are not pure, resulting in ions derived from impurities. Anything which does not form part of the sample of interest i.e. analyte, and where appropriate, matrix, may be classified as background. The exact origins of the background peaks are often unknown and vary with LC hardware, LC method and solvent combinations. In general background ions are undesirable but largely unavoidable and, as the sensitivity of mass spectrometer ion sources increases, become statistically significant in mass spectra.

In embodiments of methods disclosed herein, the m/z values of characteristic background ions are measured, rather than calculated during a survey experiment prior to injection of analyte. Characteristic background ions associated with specific chromatographic conditions are measured and added to a reference library. The background ions, for which m/z values are stored in the library, are then identified in each subsequent chromatographic analysis, and the error between the identified background ions and the m/z values stored in the library used to determine a m/z correction factor to be applied at each retention time.

Thus, it is first recognized that it is not necessary to know the elemental composition, and hence calculated m/z value of specific background ions. The m/z values of these ions may be measured during a normal m/z calibration procedure or immediately after or before an m/z calibration.

Secondly, it is recognised that the background ions associated with specific chromatographic conditions chosen for analysis may be measured in a survey step where the chromatographic conditions are held constant during the measurements. For example, the static/constant chromatographic conditions may be a constant solvent composition in the case of LC-MS, or constant column temperature in the case of Gas Chromatography (GC)-MS.

Measuring the m/z of multiple background ions under several different static chromatographic conditions allows accurate and comprehensive background libraries to be constructed to accommodate the changing nature of the background during separation.

Thirdly it is recognised that the same background peak or group of peaks cannot always be used to correct m/z drift.

This may be because of m/z interference for specific peaks, changing intensity of background ions resulting in poor statistical precision, ionization suppression due to eluting matrix or analyte, or detector saturation effects for example. Therefore, by creating a library of several background peaks, the m/z values used for correction at each point in the analytical separation may be chosen to give reliable m/z correction, and may comprise a different subset of peaks in the library depending on the data recorded at each point in the analysis.

An embodiment will now be described, by way of example only.

The method involves obtaining a library of background component data identifying background ions which are expected to be detected under different chromatographic conditions. This is carried out as a preparatory step, before performing chromatographic separation to analyse a sample. In the subsequent analysis, the chromatographic conditions are varied, to change the way in which components elute, as known in the art. For liquid chromatography methods, a solvent composition is varied, by changing the ratio of first and second solvents e.g. aqueous and organic solvents.

In an optional initial step major background ions are identified as a function of chromatographic conditions in a first survey experiment. This survey experiment should use the chromatographic conditions required for subsequent analysis i.e. the same programming to vary chromatographic conditions.

Next (or if no survey experiment is performed, first), background ion library data is obtained. Without injection of analyte the chromatographic conditions e.g. a solvent composition are set to a first static state. The mass spectrometer is calibrated using a reference standard, and the m/z values of the background ions produced under these conditions are measured either at the same time as the calibrant is introduced, or at a time immediately after the calibration is made, such that so significant m/z drift has occurred.

This process is repeated for a plurality of different chromatographic conditions, e.g. solvent compositions to build a library of m/z values of dominant background ions associated with different solvent compositions, and hence retention times. For any particular retention time in the subsequent analysis of a sample, being defined as the time between a sample being injected at the head of the separation column and the time at which the component is detected after leaving the column, the chromatographic conditions applicable to that retention time may be identified, based on knowledge of the program used to vary the chromatographic conditions, and its timing. The number of and nature of the chromatographic conditions chosen for obtaining library data may be determined from the first survey experiment, where it is performed.

It will be appreciated, that when obtaining the background ion data, it is possible to hold the solvent composition (or other chromatographic condition) static, for as long as required to obtain the background ion data. This enables peaks to be measured with greater accuracy, and the best peaks to be identified for inclusion in the library. It is possible to measure m/z of the background ions to within 1 ppm or less, enabling correction of the m/z values of analyte ions subsequently detected to the same degree of accuracy. In effect, it is possible to pause a program which varies a solvent component ratio continuously between starting and end values e.g. from 1:0 to 0:1. This is because the library data is obtained in a separate stage, prior to the sample analysis. The background ions detected for a particular chromatographic condition can be expected to correspond to those background ions which will appear when the same chromatographic condition is encountered during the subsequent analysis of a sample. It has been found that although the condition may be approached in a dynamic manner when running the actual experiment to analyse a sample, the background ion data from the library corresponding to that condition, although obtained under a static condition, will still provide a suitable approximation to the background ions which will be found in the actual experiment. The background ions are measured while the eluent e.g. solvent is passed through the chromatography apparatus. The measurement may be performed under steady state conditions.

The analyte is then separated and analysed using the chromatographic method selected. Thus, in the experiment that is performed to analyse a sample, the chromatographic conditions include conditions in respect of which library data has been obtained. The library data may relate to certain chromatographic conditions within a range within which the conditions are varied in the subsequent analysis of a sample. For example, background component data may be included in the library for 3 or 4 particular solvent ratios within a range over which the solvent composition is subsequently varied in the experiment.

The obtained output data may be post processed to associate at least some of the m/z values of the background peaks in the library with peaks located during the sample analysis. The output data will include peaks corresponding to analyte components, and optionally matrix components where the sample includes a matrix, and also peaks corresponding to background ions. As many background peaks as possible should be located. Care should be taken to avoid signals which are too weak or intense or exhibit mass interference. Not all peaks in the library may be located or used for a particular analysis or at a particular retention time.

A ppm mass error for the identified background peaks compared to the library values at each retention time, or range of retention times, is generated.

Outliers, corrupted measurements and inconsistent measurements at specific retention times may be rejected. Signals may be deemed corrupted or unreliable if they are assessed as suffering from m/z interference or detector saturation, or are below a preset intensity value. Outliers and inconsistent peaks may be identified as error values which are not consistent, within calculated statistical precision, with the other measurements at the same retention time or at a retention time immediately before or after the specific retention time.

The value of m/z correction required at each retention time is then calculated taking into account all the data at this retention time and/or data recorded locally before or after this retention time. The correction calculated may also take into account the known or expected maximum rate of m/z drift.

The m/z of the analyte peaks at each retention time in corrected based on the error values determined.

It should be noted that there are many ways to determine the required m/z correction at each retention time from the data recorded. FIG. 1 shows a simplified representation of the type of data which may be recorded using the method described. FIG. 1 shows a plot of ppm error vs retention time (RT). The black circles represent the ppm error values calculated from the difference between the m/z values in the previously recorded library of background ions and background ions located in a subsequent analytical run.

In this example, over the course of the analysis the solvent composition changed from 100% aqueous [1] to 50% aqueous 50% organic solvent [2] to finally 100% organic solvent [3].

Measurements [4] which were deemed to be inconsistent with the rest of the data (outliers) or corrupted and excluded from the calculation of the correction factor.

The dotted line represents a line of best fit or moving average through the data. This function may be constrained, for example with a maximum value of curvature, based on the known or expected characteristics of the instrument.

The correction values calculated from this fitted function are then used to correct the entire data set. In this case only slowly varying long term drift in m/z will be corrected at each RT. Short term drift may be accommodated using other functions or allowing higher curvature. In the limit, correction may be made for each mass spectrometer scan in the chromatogram using an average of the errors calculated for all the background peaks identified within that scan.

Many other schemes can be envisaged.

To illustrate the method described the approach was applied to the separation and exact mass measurement of nine small molecules in human urine using an UPLC separation method coupled with a Q ToF mass spectrometer without the use of known internal or external calibration during the chromatographic run.

The LC gradient used is shown in Table 1.

Solvent A=Water, Solvent B=Acetonitrile.

TABLE 1

| Time(min) | Flow rate | % A | % B |
| --- | --- | --- | --- |
| 0 | 0.600 | 95.0 | 5.0 |
| 0.50 | 0.600 | 95.0 | 5.0 |
| 10.00 | 0.600 | 5.0 | 95.0 |
| 10.50 | 0.600 | 5.0 | 95.0 |
| 10.60 | 0.600 | 95.0 | 5.0 |
| 12.00 | 0.600 | 95.0 | 5.0 |

Figure 2:
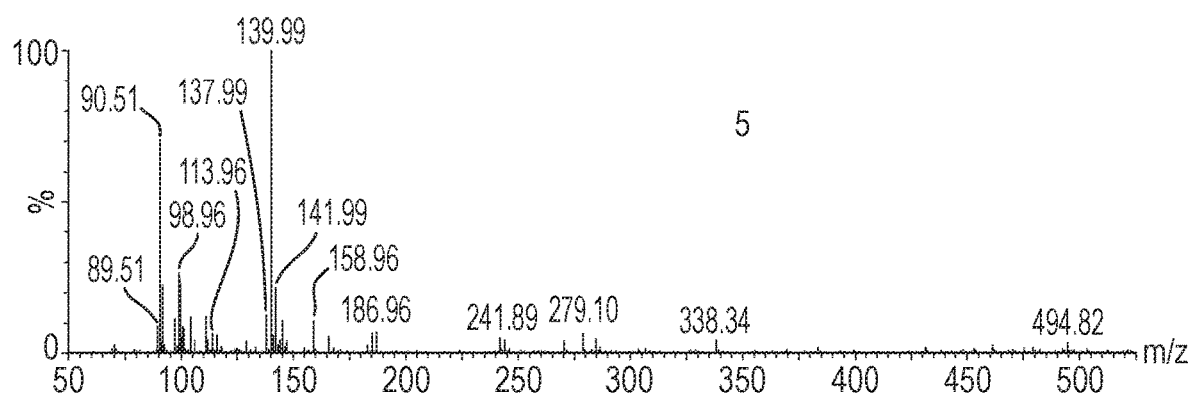
FIG. 2 shows the spectra of background ions recorded during an initial scan to obtain background component library data at three different solvent compositions.
Figure 2:
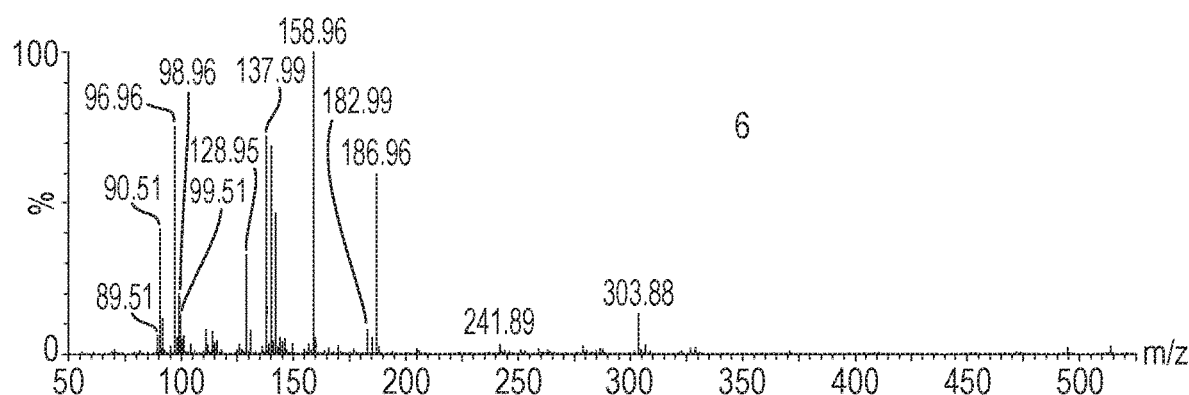
Figure 2:
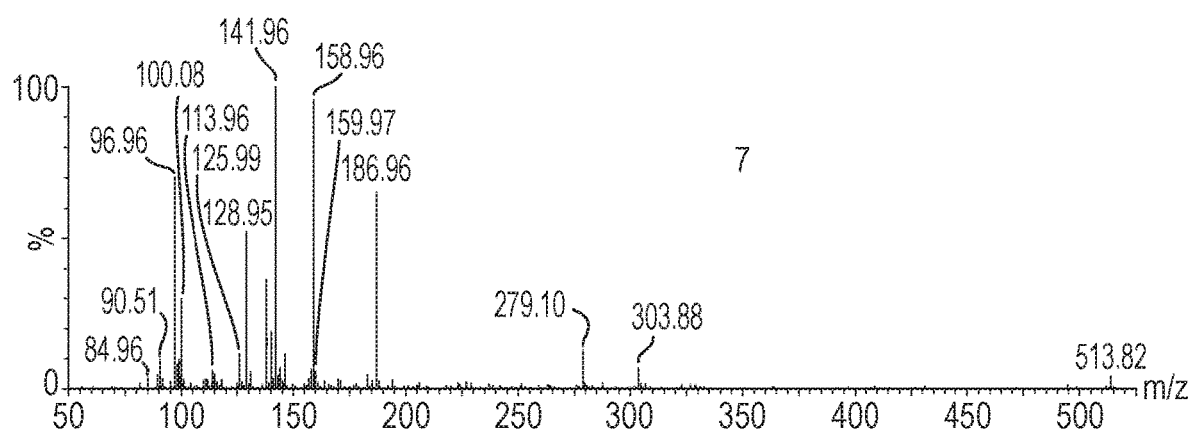

FIG. 2 shows the spectra of the background ions recorded during an initial survey scan at three different solvent compositions. During this survey experiment no analyte or matrix was injected.

Spectrum 5 shows the composition of solvent ions for a solvent composition of 15% Water and 75% Acetonitrile.

Spectrum 6 shows the composition of solvent ions for a solvent composition of 50% Water and 50% Acetonitrile.

Spectrum 7 shows the composition of solvent ions for a solvent composition of 95% Water and 5% Acetonitrile.

As can be seen many of the background ions are common but at different intensities at the different compositions of solvent. However, some ions are unique to the specific solvent composition.

Although there are many background ions which may be measured and used to construct a library, for the purpose of simplifying data processing seven background ions were chosen to construct a library.

The m/z values for the seven background ions chose are shown in table 2.

TABLE 2

| | m/z |
| --- | --- |
| 1 | 279.0934 |
| 2 | 128.9513 |
| 3 | 158.9619 |
| 4 | 141.9592 |
| 5 | 186.9570 |
| 6 | 513.8170 |
| 7 | 243.8850 |

To measure the m/z values of the background ions the instrument was first calibrated using a multi point calibration. The liquid chromatography (LC) solvent composition was then set to a fixed value and the composition at the ion source allowed to stabilize.

The LC flow was diverted to waste and a known reference compound was introduced for approximately 5 seconds. The flow from the LC was then redirected back to the mass spectrometer and data from the background acquired. By taking a series of such measurements, an accurate and precise m/z value for the background ions was obtained accounting for any instrument m/z drift by correcting the m/z scale based on the known m/z of the reference compound. This was repeated at several LC solvent compositions.

Although this was achieved manually this procedure may be simply automated.

Many other methods of accurately measuring the m/z of the background peaks can be envisaged. For example a calibrant flow may be added into the solvent flow, post column, at the same time as the LC flow. Care should be taken the calibrant this is not interfered with by the background ions, and that it is sufficiently soluble across the range of solvent compositions measured.

The system was then left for approximately 2 hours so that significant m/z drift occurred.

The test sample spiked into human urine matrix was then analysed.

Figure 3A:
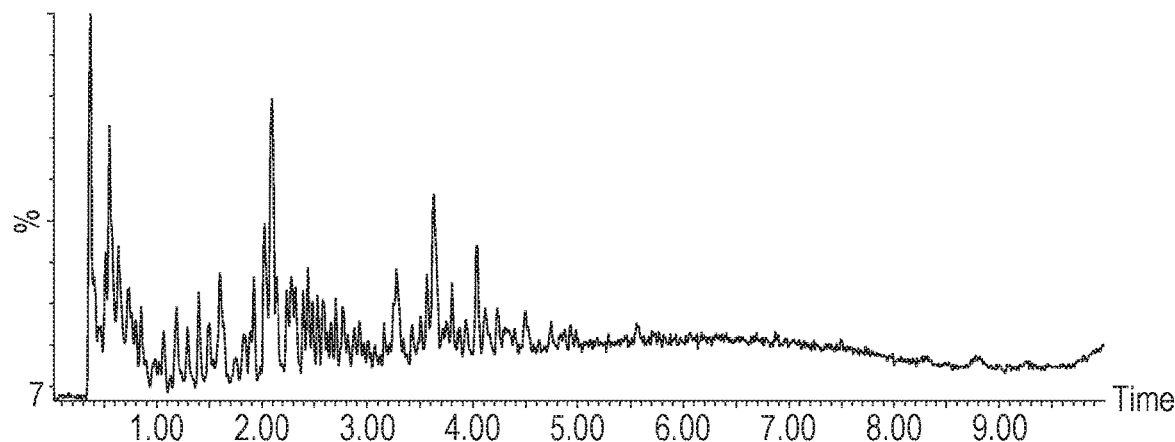
FIG. 3A shows the total ion chromatogram obtained when analysing a test sample spiked into human urine.

FIG. 3A shows the total ion chromatogram produced.

Figure 3B:
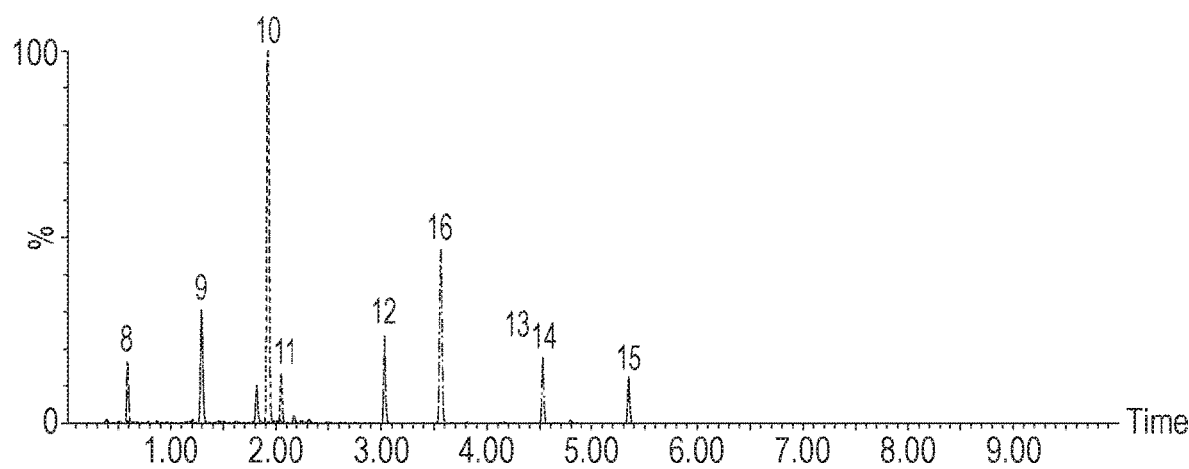
FIG. 3B shows the, overlaid, extracted mass chromatograms of the nine compounds spiked into the urine.
Figure 4A:
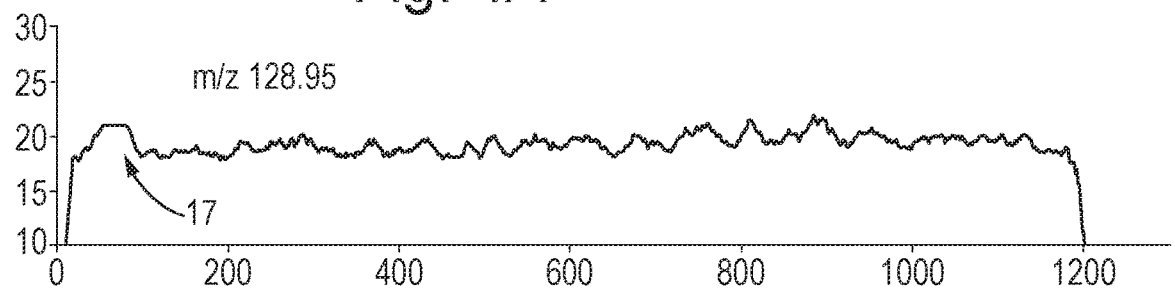
FIG. 4 shows the plots of ppm error vs retention time (scan number) for the seven background peaks in the library in Table 2 matched in the data shown in FIG. 3.
Figure 4B:
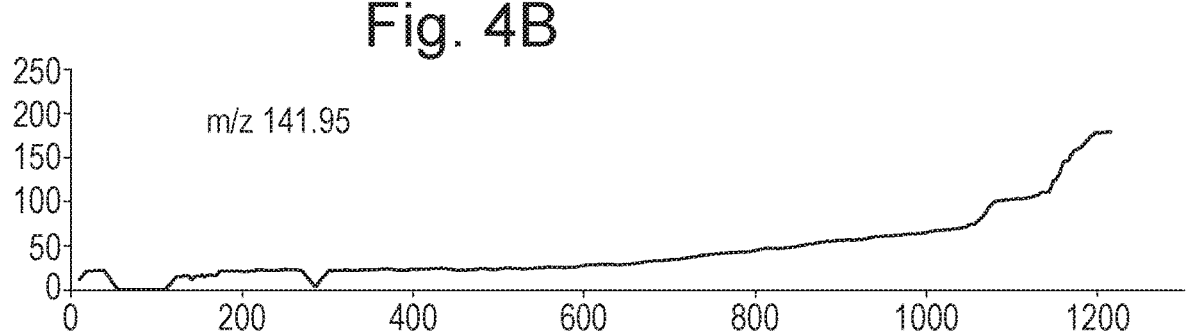
Figure 4C:
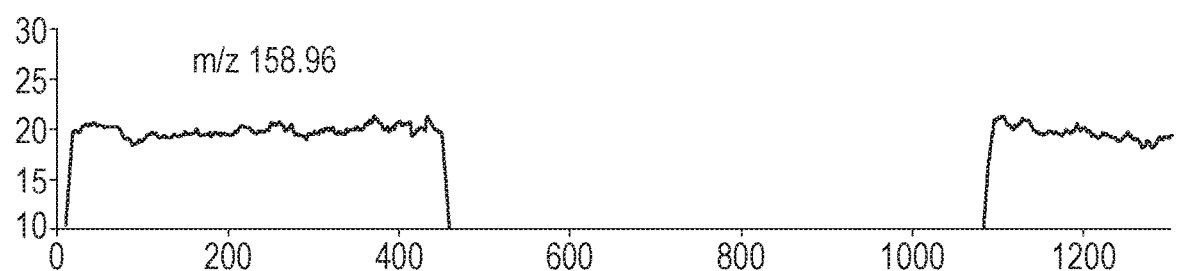
Figure 4D:
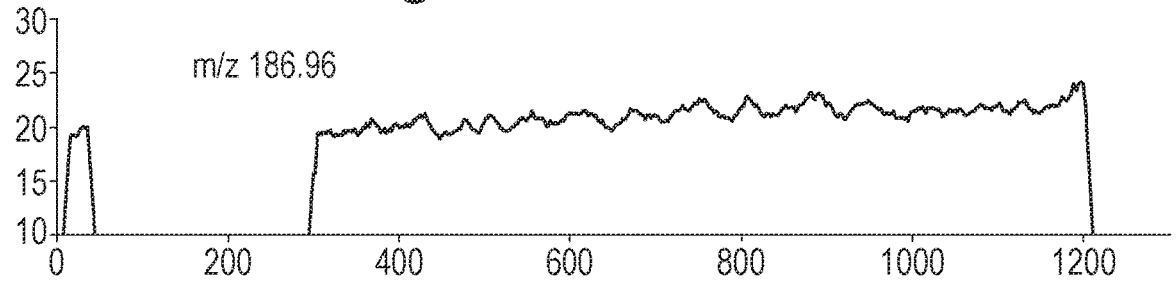
Figure 4E:
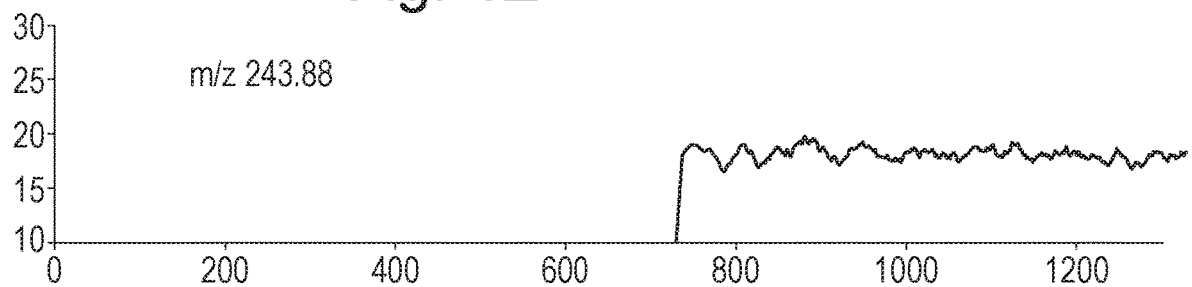
Figure 4F:
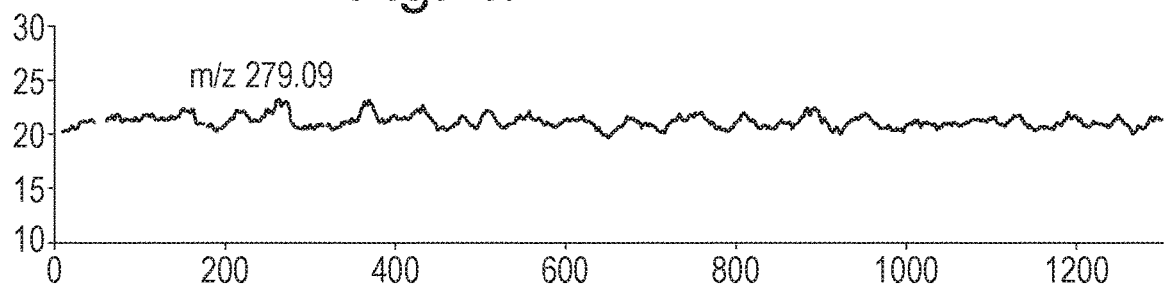
Figure 4G:
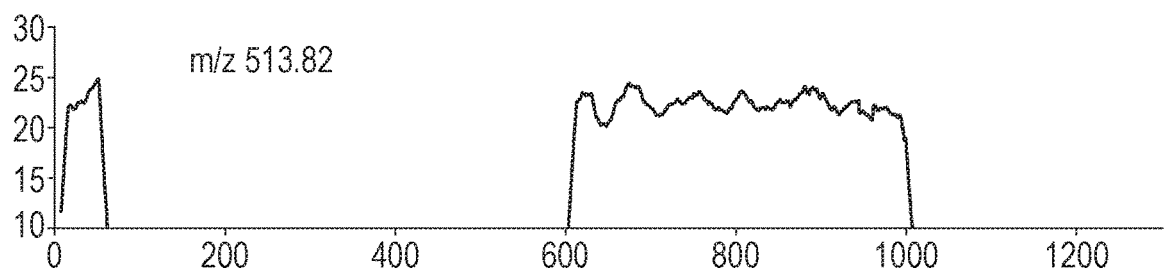

FIG. 3B shows the, overlaid, extracted mass chromatograms of the nine compounds spiked into the urine.

Table 3 shows the calculated m/z values for the nine components shown in FIG. 3B.

TABLE 3

| 9 | 4-acetamidophenol | 152.0712 |
| --- | --- | --- |
| 10 | Caffeine | 195.0882 |
| 8 | sulfaguanidine | 215.0603 |
| 13 | Sulfadimethoxime | 311.0815 |
| 11 | Val-Tyr-Val | 380.2185 |
| 14 | verapamil | 455.2910 |
| 16 | Terfenadine | 472.3216 |
| 12 | Leu-Enkephalin | 556.2771 |
| 15 | Reserpine | 609.2812 |

FIG. 4 shows plots of ppm error vs retention time (scan number) for the seven background peaks in the library in Table 2 matched in the data shown in FIG. 3.

With reference to FIG. 4

A=m/z 128.95

B=m/z 141.95

C=m/z 158.96

D=m/z 186.96

E=m/z 243.88

F=m/z 279.09

G=m/z 513.82

Data was acquired at a rate of 2.5 spectra/second. This refers to the acquisition rate of the mass spectrometer. The plots in FIG. 4 show a moving average (17 scans) of the error values for each background ion within each spectrum.

An intensity threshold was imposed such that only peaks above 2500 ion counts in a single spectrum were included. This ensures that good statistical precision is maintained in every measurement.

It will be appreciated that in general, scan number will correlate to retention time, and a determining a parameter as a function of retention time may involve determining the parameter as a function of scan number.

In plot B it can be seen that the ppm error values recorded for m/z 141.95 steadily increased during the run. On examination this was caused by m/z interference.

Figure 5:
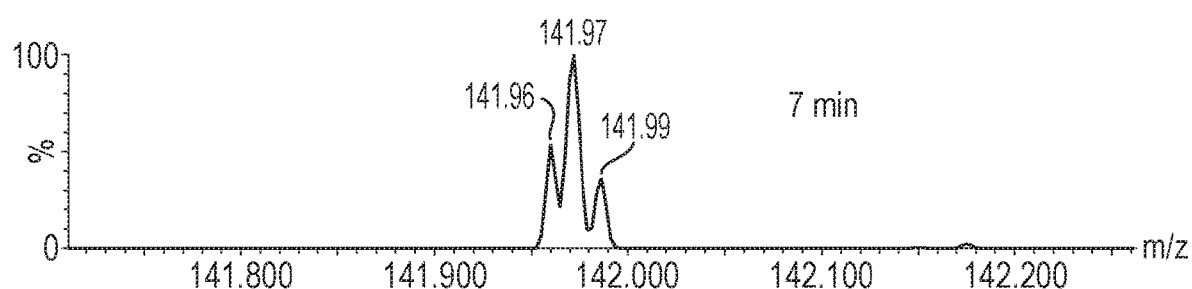
FIG. 5 shows the mass spectrum recorded for the background peak with m/z 141.95 at a number of different retention times (scan numbers)
Figure 5:
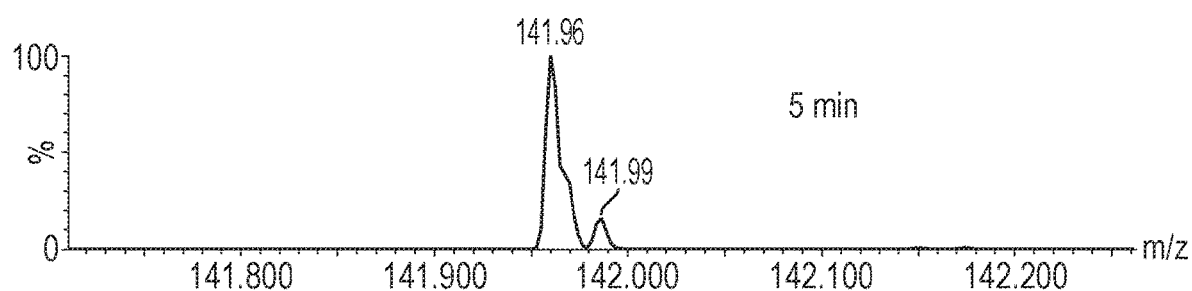
Figure 5:
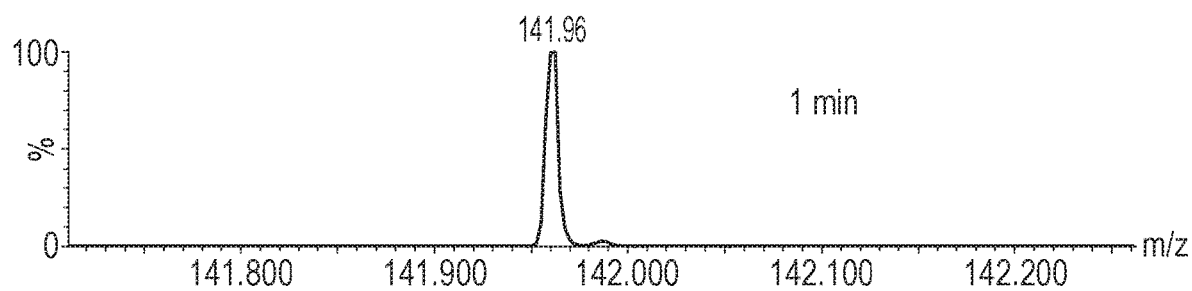

FIG. 5 shows the mass spectrum recorded for this m/z value at 1 minute (scan 150) 5 minutes (scan 700) and 7 minutes (scan 1000). This m/z interference may be automatically detected during peak integration or peak detection. Methods such as those described in U.S. Pat. No. 7,202,473B2 to identify interferences may be employed. This m/z value was omitted from further calculations.

In the case of plot C the intensity of the peak at m/z 158.96 was determined to saturate the detection system between scan ~450 and ~1100. Again this saturation may be automatically detected and these results excluded using methods such as those described in US20160155621A1.

Figure 6A:
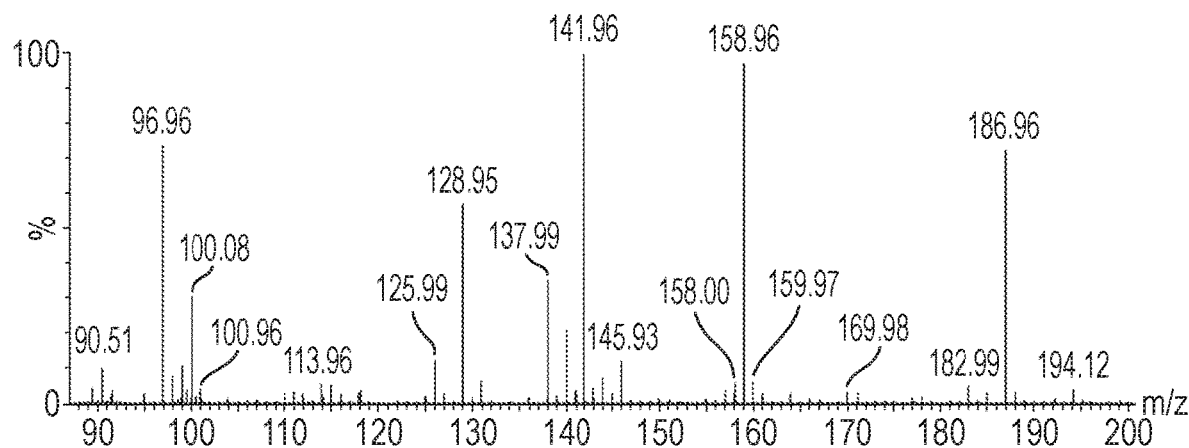
FIG. 6 shows the portion of the mass spectra corresponding to the chromatogram obtained when analysing the test sample as shown in FIG. 3A at two particular scan numbers.
Figure 6B:
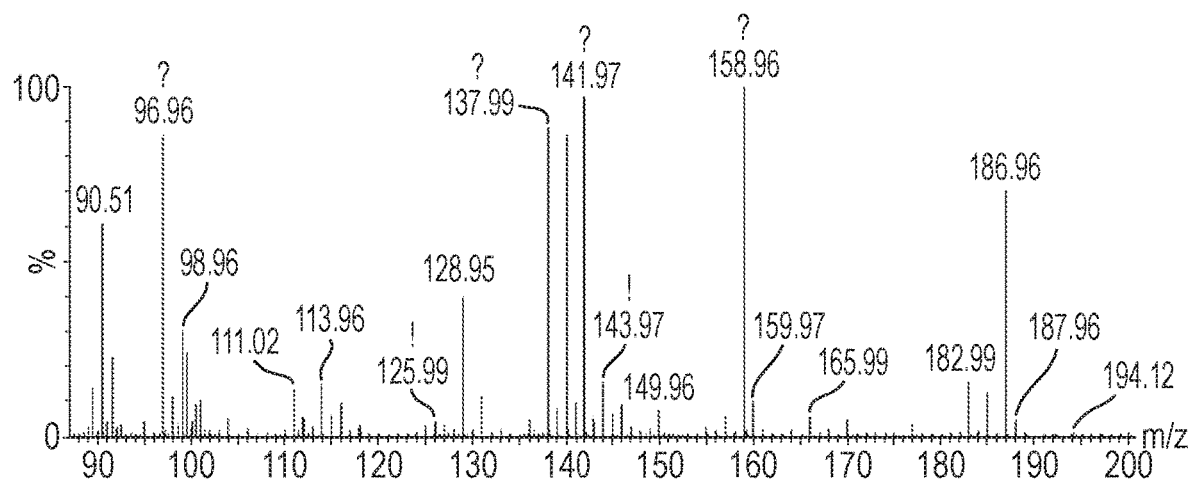

FIG. 6 shows a portion of the mass spectra at (A) scan 200 and (B) scan 870. The peaks in spectrum B marked with a "?" symbol denote those peaks which have been automatically flagged as saturated. Peaks may alternatively be rejected based on an upper amplitude threshold determined from the known characteristics of the analyser.

In plot A of FIG. 4, the region marked [17] corresponds to a short region of the chromatogram where the peak at 128.95 drops below the fixed amplitude threshold due to ion suppression caused by elution of the matrix. In this example, rather than record no data the ppm error was set to the last recorded value until the peak intensity increased and another measurement was made. For example if it is determined that none of the background ions in the library can be used to determine a correction value for a short period of the analysis the correction value may be set to that last valid value until a new measurement can be made. Alternatively an extrapolation between the last valid measurement and the next valid measurement can be used in this region.

In this example this region of the data can be ignored as valid measurement of several of the other background ions was made.

The other gaps in the data in FIG. 4 appear for a number of reasons including peaks falling below the fixed amplitude threshold, m/z interference and detection system saturation.

It can be seen that for this example the peak at m/z 279.09 in plot F can be measured over the entire chromatographic run.

Figure 7:
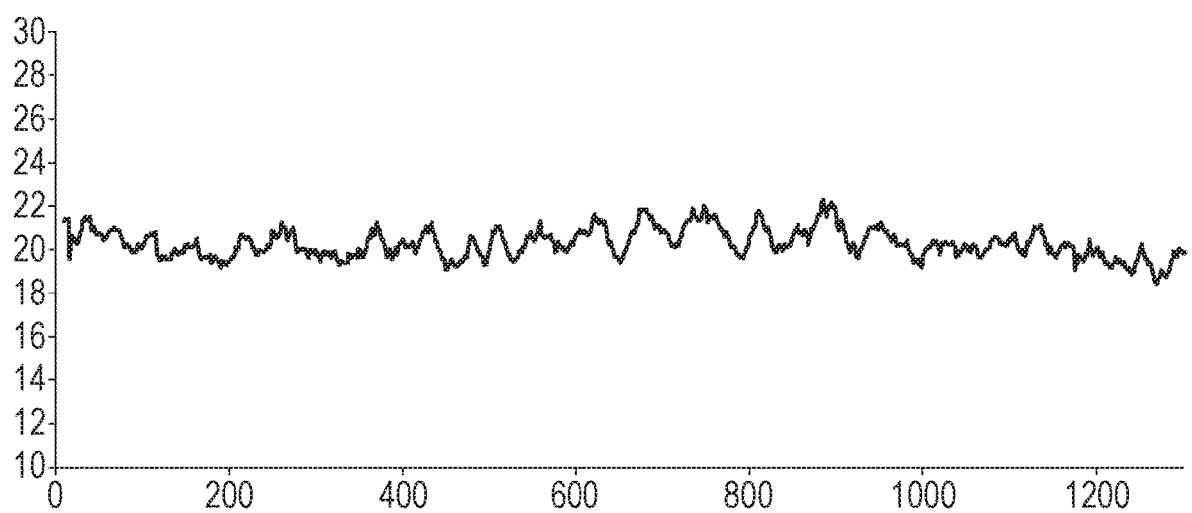
FIG. 7 shows a composite plot of ppm error vs scan number constructed by taking a simple average of the data for all valid measurement at each scan number.

FIG. 7 shows a composite plot of ppm error vs scan number constructed by taking a simple average of the data for all the valid measurements at each scan number shown in FIG. 4. Each scan in the data shown in FIG. 3 was corrected using these error values.

The mass measurement accuracy of the 9 components corrected using the background ions is shown in Table 4. The mean=−0.6 ppm, RMS=1 ppm

TABLE 4

| Compound name | Measured m/z | Calculated m/z | ppm error |
|---|---|---|---|
| 4-acetamidophenol | 152.0713 | 152.0712 | 0.6 |
| Caffeine | 195.0880 | 195.0882 | −1.0 |
| Sulfaguanidine | 215.0603 | 215.0603 | 0 |
| Sulfadimethoxime | 311.0813 | 311.0814 | −0.3 |
| Val-Tyr-Val | 380.2178 | 380.2185 | −1.8 |
| Verapamil | 455.2910 | 455.2910 | 0 |
| Terfenadine | 472.3209 | 472.3216 | −1.5 |
| Leu-Enkephalin | 556.2767 | 556.2771 | −0.7 |
| Reserpine | 609.2805 | 609.2812 | −1.1 |

It will be appreciated that if $MS^e$ experiments are performed, the library may contain molecular ion and fragment ions from the background.

If a Data Dependent Acquisition (DDA) experiment is performed where a mass spectrometer (MS) survey scan is followed by a series of MS/MS scans, the correction factor determined from background ions in the survey scan can be used to correct the m/z values in the MS/MS scans acquired closely in time. In some forms of DDA, full MS survey spectra is obtained at low collision energy, with a number of peaks then chosen to perform MS/MS on. These peaks are then cycled through, selecting precursors with a mass filter, and fragmenting them sequentially to produce a number of MS/MS spectra. In this situation, the library background peaks may not appear in the MS/MS data, as these precursors are not being transmitted. To mass measure the MS/MS, the survey scan correction factors may be used, and extrapolated to the correction value for the MS/MS data, which is close in time to the survey scan data. Alternatively MS/MS data of identified background ions may be acquired.

Other methods of processing and combining ppm vs time or scan data may be used.

It may be possible to apply correction during the separation based on the background peaks. This is in contrast to the post processing methods described. For example, real-time correction using a moving average of previous data points may be employed.

Other instrument parameters may be monitored and corrections made, for example mass resolution, to monitor instrument performance or apply real time correction.

Ion mobility may be included, and the method used to correct for mobility drift (lock drift using background ions). The Collision Cross Section (CCS) or Drift Time (DT) may be used as a confirmation of the identity of a background peaks to assist in matching library peaks to peaks in the analytical run.

In an alternative embodiment, rather than performing calibration close to a library run as described above, one or more contaminants may be spiked into the LC solvents, such that known m/z values will appear within the obtained data at certain solvent compositions, and may be used to calibrate the background ion data obtained for use in providing the library data. The added calibrant may be designed such that it is separated from the analyte in m/z, and/or DT space, reducing the possibility of mass interference.

Other known methods may be combined with the embodiments disclosed. For example a known external lock mass may optionally be used periodically during the chromatographic run. The m/z correction from this measurement may be combined with measurements from the background ions to improve the overall drift correction.

If the accurate m/z values of eluting matrix components are known or have been measured, these values may also be used in conjunction with the method disclosed, using techniques described in GB 2536536 (Micromass). Similarly, known internal standards may be introduced with the analyte. These may be used to calculate a drift correction value at their elution times which may be combined with measurements from background ions as described.

In the examples given, only a fixed ppm drift or gain correction is discussed. As the data from the background ions are for a range of m/z values, the same data can be used to correct for time offset drift. Time offset drift may be caused by drift in the discriminator levels used to trigger digitization electronics.

While in the above embodiments the background ion data for the library is obtained by setting the chromatographic conditions static, and then performing measurement of the background for as long as necessary, the background ions may be measured while running a gradient program to change chromatographic conditions, i.e. as the conditions change in a dynamic manner. This may be in the same manner as they will be changed in a sample separation, but without the injection of a sample. An internal or periodic external reference may then be introduced to build the library.

In embodiments at least, the methods described herein may reduce or remove the need for periodic introduction of an external reference or lock mass signal to correct for m/z drift. Periodic introduction of a reference compound requires complex mechanical arrangements and can result in loss of analyte data. The method removes the requirement for introduction of a known internal lock mass. Introduction of internal lock masses can lead to suppression of, or interference with analyte peaks.

The background ion data may be obtained for the library at any desired number of chromatographic conditions. For example, in the embodiments above, the data may be obtained for 2, 3 or 5 different solvent ratios. Moreover, the solvent may comprise more than two components e.g. three components, whose ratio is varied over the course of an experiment.

While, in the examples described above, the chromatographic separation is a liquid chromatographic separation, and the chromatographic condition has been a solvent composition, other types of chromatographic separation and/or chromatographic conditions may be used. For example, for a gas chromatographic separation, the chromatographic condition which is varied during an experiment, and in respect of values of which background ion data is obtained for the library, may be a column temperature. In yet further examples, the chromatographic condition may be a pH.

It will be appreciated that the library data may be used in various manners to obtain values for correcting the sample data. Where the background ions have been detected at chromatographic conditions which are within a range over which chromatographic conditions are varied in the course of the analytical experiment, in a simple arrangement, all of the background ions in the library could be sought in the resulting sample data. It may be assumed that each background ion should be detectable somewhere in the resulting data i.e. at some retention time, as the relevant condition will be encountered at some point. However, it is not necessary to look for all background ions included in the library. Specific ions could be sought based upon knowledge of the retention time at which they can be expected. This may be achieved with knowledge of the chromatographic condition at which the background ions were detected in the library run, which is reflected in the library data, and the retention time to which the output data e.g. mass spectrum being analysed relates. For example, toward the end of the run, only the background ion data associated with the chromatographic conditions encountered towards the end of the run may be searched to try to identify background ions in the output data. As mentioned above, any retention time may be correlated to a chromatographic condition. Thus, only part of the library database may be used. This may help to avoid false positives.

In accordance with various additional embodiments, the Applicant has recognised that in many chromatographic methods the solvent composition at the end of the elution profile returns to the composition which existed at the start of the experiment. This ensures that the solvent composition has equilibrated for sufficient time before an injection of analyte is made. Thus, it may be known that over a specific retention time period at the start of the experiment the solvent composition is the same as over a specific retention time period at the end of the experiment. At these two retention time periods, the composition of the solvent and hence the nature of the background signal recorded will be substantially the same.

In various embodiments, a library of measured background components is generated from a single solvent composition, which may be known to exist at more than one retention time during the analysis. In various embodiments, this single solvent composition may exist at the start of the solvent gradient, for example after injection of the sample but before analyte has started to elute from the chromatogram, and at the end of the solvent gradient, for example where all of the analyte compounds have already eluted.

A correction value may be determined using the library for data at either the first retention time or the second retention time, or a combination of both the first and second retention time data, for example in the manner described above.

In these embodiments, it may be that no correction value is calculated from data at other solvent compositions. Correction values for data at retention times other than the two retention times discussed may be calculated using either of the two calculated correction values alone or by interpolation between the correction value calculated at the start of the chromatographic separation and at the end of the chromatographic separation.

For example, in various embodiments, LC background ions may be measured at the beginning of the chromatographic run, just after injection at 100% water, and then again right at the end at 100% water (where the solvent gradient is run in between), and correction values may be calculated for, and then extrapolated between these two values. It will be appreciated that in these embodiments, only one chromatographic condition is used, and that background components that are present before and after the analyte has eluted but after it has been injected are considered.

Although as described above, in various embodiments the library is generated before the sample is chromatographically separated (for example as a preparatory step), it would also or instead be possible to generate the library during chromatographic separation of the sample. In particular, in accordance with various embodiments, the library may be generated by performing one or more measurements on the mobile phase under the initial chromatographic condition of the chromatographic separation to determine background component data for the initial chromatographic condition. That is, the library may be generated by performing one or more measurements on the solvent at the solvent composition that exists at the start of the solvent gradient, for example after injection of the sample but before analyte has started to elute from the chromatogram.

In these embodiments, one or more error values may be calculated by comparing the library background components present at the start of the chromatographic separation to background components present at the end of the chromatographic separation (where the chromatographic condition returns to its original state), for example in the manner described above. It would also be possible to calculate one or more error values by comparing the library background components present at the start of the chromatographic separation to background components present during the chromatographic separation (where, for example, even though the composition is changing during the run some background components may still persist).

One or more adjustment or correction values may be calculated based on the one or more error values (and then used), for example in the manner described above, optionally by interpolating over some or all of the chromatographic separation.

Although the present disclosure has been described with reference to various embodiments, it will be understood by those skilled in the art that various changes in form and detail may be made without departing from the scope of the disclosure as set forth in the accompanying claims.

The invention claimed is:

1. A method comprising:
providing a library of measured background component data, the measured background component data comprising, for each one of one or more chromatographic conditions, one or more physico-chemical properties of one or more background components expected to be detected when performing chromatographic separation under the condition;
chromatographically separating a sample, the sample containing one or more analyte components, wherein at least some of the chromatographic separation is performed under a chromatographic condition in respect of which background component data is provided in the library;
obtaining output data including sample data comprising one or more physico-chemical properties of one or more sample components as a function of retention time;
calculating one or more error values based on a comparison between one or more background components identified in the output data and background component data obtained from the library of background component data; and
calculating one or more adjustment or correction values based on said one or more error values;
wherein the one or more background components do not correspond to components introduced as part of the sample.

2. The method of claim 1, wherein the step of providing the library of background component data comprises passing a mobile phase through a chromatographic separation apparatus and performing one or more measurements on the mobile phase under each one of the one or more chromatographic conditions to determine background component data for each chromatographic condition, wherein:
the one or more measurements of the mobile phase to determine the background component data are performed without the introduction of a sample comprising an analyte to the mobile phase; and/or
the one or more measurements of the mobile phase to determine the background component data are performed after introduction of a sample comprising an analyte to the mobile phase but before the analyte has started to elute from the chromatographic separation apparatus.

3. The method of claim 2, wherein the chromatographic separation apparatus used in providing the library of background component data is a liquid chromatographic separation apparatus, and the mobile phase comprises a solvent, each one of the one or more chromatographic conditions being a composition of the solvent, optionally wherein the solvent comprises multiple components, and the composition of the solvent is a ratio of the solvent components.

4. The method of claim 2, wherein the chromatographic separation apparatus used in providing the library of background component data is a gas chromatographic separation apparatus comprising a separation column, and the mobile phase comprises a carrier gas, and each one of the one or more chromatographic conditions is a temperature setting of the separation column of the chromatographic separation apparatus.

5. The method of claim 2, wherein the step of providing the library of background component data comprises varying a chromatographic condition while passing the mobile phase through the chromatography apparatus, and determining background component data for each one of a plurality of different chromatographic conditions.

6. The method of claim 2, wherein the method comprises holding the chromatographic condition static while obtaining the background component data for each one of the one or more chromatographic conditions.

7. The method of claim 1, wherein the library comprises, for each one of one or more chromatographic conditions, background component data in respect of a plurality of different background components.

8. The method of claim 1, wherein the step of measuring the mobile phase to obtain the background component data in respect of each chromatographic condition comprises obtaining one or more mass spectrum under each one of the one or more chromatographic conditions, and identifying one or more background components in respect of each chromatographic condition for inclusion in the library.

9. The method of claim 1, wherein the physico-chemical property in respect of the or each background component is a mass to charge ratio.

10. The method of claim 1, wherein the step of calculating one or more error values comprises determining, for one or more background component identified in the output data, a difference between a physico-chemical property of the background component identified in the output data and a corresponding physico-chemical property of the background component according to the library data.

11. The method of claim 1, wherein the library of background component data comprises one or more physico-chemical properties of a plurality of different background components, and the step of calculating one or more error values comprises calculating a plurality of error values, wherein each error value is in respect of a different background component identified in the output data.

12. The method of claim 1, wherein the step of calculating one or more error values comprises calculating one or more error values based on a comparison between one or more background components identified in output data obtained under a single chromatographic condition and background component data obtained from the library of background component data, optionally wherein the single chromatographic condition occurs at least twice during the chromatographic separation.

13. A method comprising:
providing a library of measured background component data, the measured background component data comprising, for each one of a set of a plurality of different chromatographic conditions, one or more physico-chemical properties of one or more background components expected to be detected when performing chromatographic separation under the condition;
chromatographically separating a sample, the sample containing one or more analyte components, wherein at least some of the chromatographic separation is performed under a chromatographic condition in respect of which background component data is provided in the library;
analysing the sample to obtain output data including sample data comprising one or more physico-chemical properties of one or more sample components as a function of retention time;
calculating one or more error values as a function of retention time based on a comparison between one or more background components identified in the output data and background component data obtained from the library of background component data; and
calculating one or more adjustment or correction values based on said one or more error values;
wherein the one or more background components do not correspond to components introduced as part of the sample.

14. The method as claimed in claim 1, wherein said step of calculating one or more adjustment or correction values comprises plotting or calculating a plurality of error values as a function of retention time and determining said adjustment or correction values from said plot or calculation.

15. The method as claimed in claim 1, wherein the step of calculating one or more adjustment or correction values comprises plotting or calculating a plurality of error values as a function of retention time and determining said adjustment or correction value from a line of fit or interpolation associated with said plot or calculation of said plurality of error values.

16. The method as claimed in claim 1, further comprising adjusting or correcting mass spectral data associated with said sample using said adjustment or correction value.

17. The method as claimed in claim 1, further comprising adjusting or correcting one or more instrument parameters using said adjustment or correction values.

18. A method as claimed in claim 1, wherein any of said physico-chemical properties comprises one or more of mass, mass to charge ratio, drift time, collision cross section ("CCS"), interaction cross section, ion mobility and differential ion mobility.

19. A mass spectrometer comprising:
a chromatography apparatus arranged and adapted to chromatographically separate a sample;
wherein the mass spectrometer is arranged and adapted to analyse the sample at one or more retention times to obtain sample data, the sample data comprising one or more physico-chemical properties of one or more sample components as a function of retention time;
the mass spectrometer further comprising a control system arranged and adapted to;
obtain data from a library of measured background component data, the measured background component data comprising, for each one of one or more chromatographic conditions, one or more physico-chemical properties of one or more background components expected to be detected when performing chromatographic separation under the condition;
cause the chromatography apparatus to chromatographically separate a sample, the sample containing one or more analyte components, wherein at least some of the chromatographic separation is performed under a chromatographic condition in respect of which background component data is provided in the library;
cause the mass spectrometer to obtain output data including sample data comprising one or more physico-chemical properties of one or more sample components as a function of retention time;
calculate one or more error values based on a comparison between one or more background components identified in the output data and background component data obtained from the library of background component data; and
calculate one or more adjustment or correction values based on said one or more error values;
wherein the one or more background components do not correspond to components introduced as part of the sample.

20. A method as claimed in claim 1, wherein the step of chromatographically separating the sample comprises supplying both an eluent and the sample to a chromatography apparatus, wherein the one or more background components arise from components of the eluent and/or materials of the chromatography apparatus.

* * * * *